United States Patent
Drennan et al.

(10) Patent No.: US 10,392,109 B2
(45) Date of Patent: Aug. 27, 2019

(54) MUTUALLY SYMBIOTIC AIRCRAFT SYSTEMS

(71) Applicant: Bell Helicopter Textron Inc., Fort Worth, TX (US)

(72) Inventors: Joseph Scott Drennan, Fort Worth, TX (US); John William Lloyd, Fort Worth, TX (US); Frank Bradley Stamps, Fort Worth, TX (US); Brett Rodney Zimmerman, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 450 days.

(21) Appl. No.: 15/341,887

(22) Filed: Nov. 2, 2016

(65) Prior Publication Data

US 2018/0118336 A1 May 3, 2018

(51) Int. Cl.
| | |
|---|---|
| *B64C 37/02* | (2006.01) |
| *B64C 39/02* | (2006.01) |
| *B64D 39/00* | (2006.01) |
| *B64C 3/32* | (2006.01) |

(52) U.S. Cl.
CPC ............ *B64C 37/02* (2013.01); *B64C 3/32* (2013.01); *B64C 39/024* (2013.01); *B64D 39/00* (2013.01); *B64C 2201/042* (2013.01); *B64C 2201/066* (2013.01); *B64D 2211/00* (2013.01); *Y02T 50/55* (2018.05)

(58) Field of Classification Search
CPC .............. B64C 3/32; B64C 2201/066; B64C 2201/088; B64C 37/02; B64C 5/02; B64C 29/00; B64D 5/00
See application file for complete search history.

(56) References Cited

U.S. PATENT DOCUMENTS

| | | | | |
|---|---|---|---|---|
| 2007/0102565 A1* | 5/2007 | Speer | .................... | B64C 39/024 244/2 |
| 2009/0294573 A1* | 12/2009 | Wilson | ................... | B64C 39/024 244/2 |
| 2010/0193625 A1* | 8/2010 | Sommer | ................ | B64C 37/02 244/2 |

FOREIGN PATENT DOCUMENTS

| | | | | |
|---|---|---|---|---|
| EP | 3006334 A1 * | 4/2016 | ........... | B64C 39/024 |
| WO | WO-2017071772 A1 * | 5/2017 | ............. | B64C 37/02 |

\* cited by examiner

*Primary Examiner* — Philip J Bonzell
*Assistant Examiner* — Tye William Abell
(74) *Attorney, Agent, or Firm* — Lawrence Youst PLLC

(57) ABSTRACT

An aircraft system includes a wing member and a plurality of unmanned aircraft systems selectively connectable to the wing member. The wing member has a generally airfoil cross-section, a leading edge and a trailing edge. The unmanned aircraft systems have a connected flight mode while coupled to the wing member and an independent flight mode when detached from the wing member. In the connected flight mode, the unmanned aircraft systems are operable to provide propulsion to the wing member to enable flight. The unmanned aircraft systems are operable to be launched from the wing member to perform aerial missions in the independent flight mode and are operable to be recovered by the wing member and returned to the connected flight mode. Thereafter, in the connected flight mode, the unmanned aircraft systems are operable to be resupplied by the wing member.

19 Claims, 15 Drawing Sheets

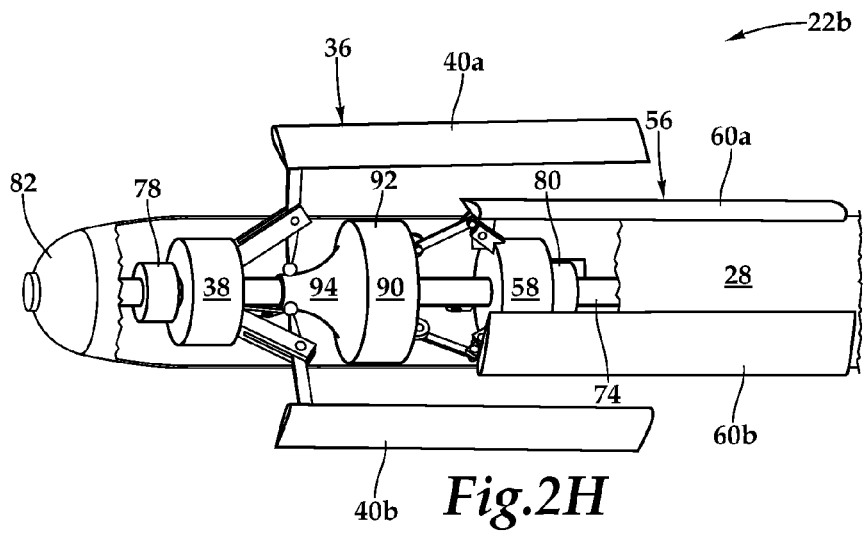
*Fig.2H*
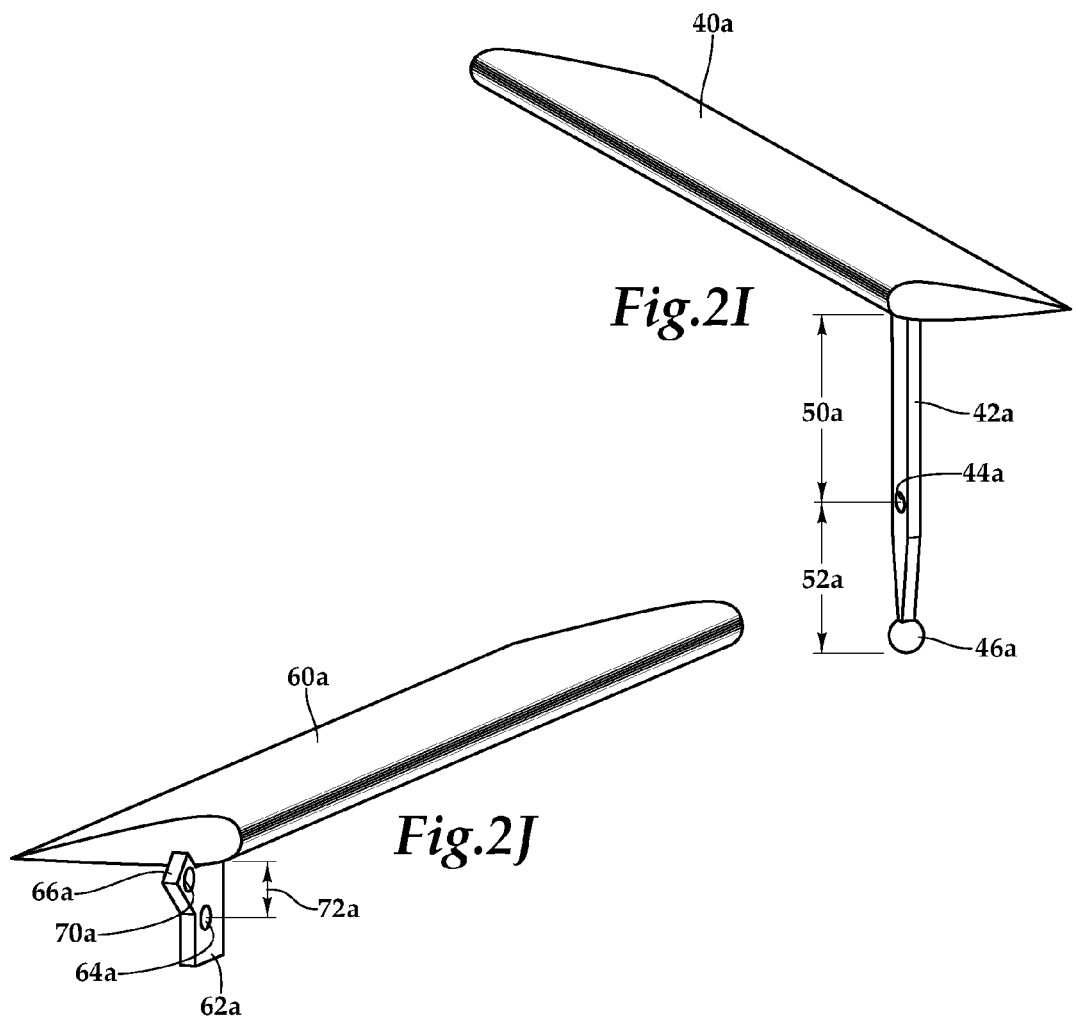
*Fig.2I*
*Fig.2J*

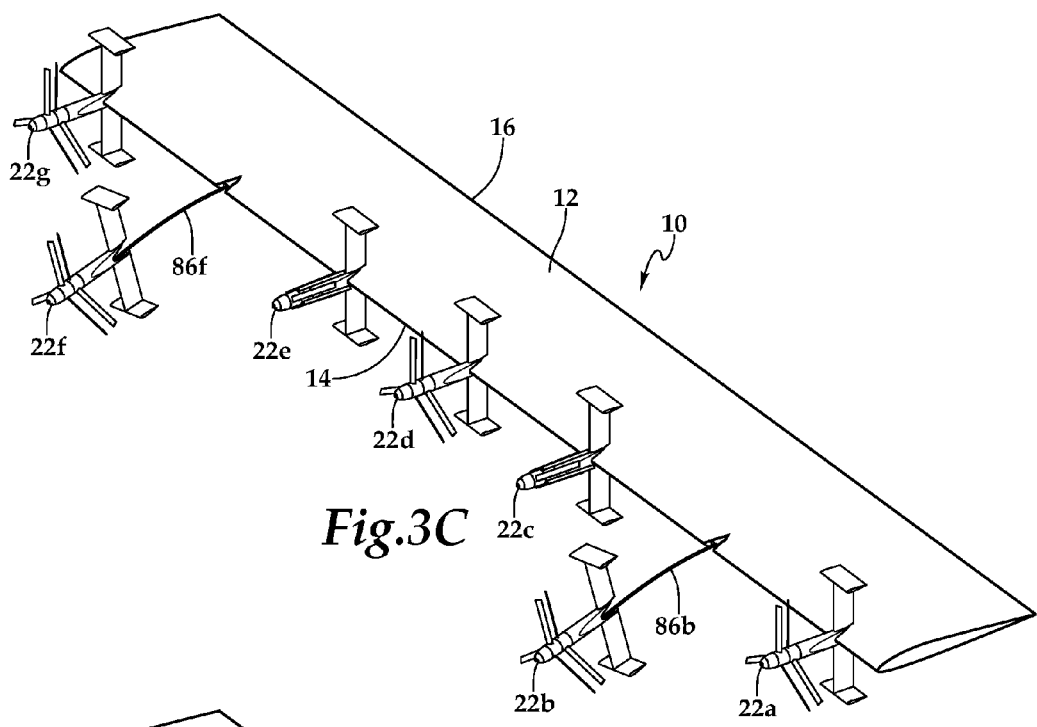
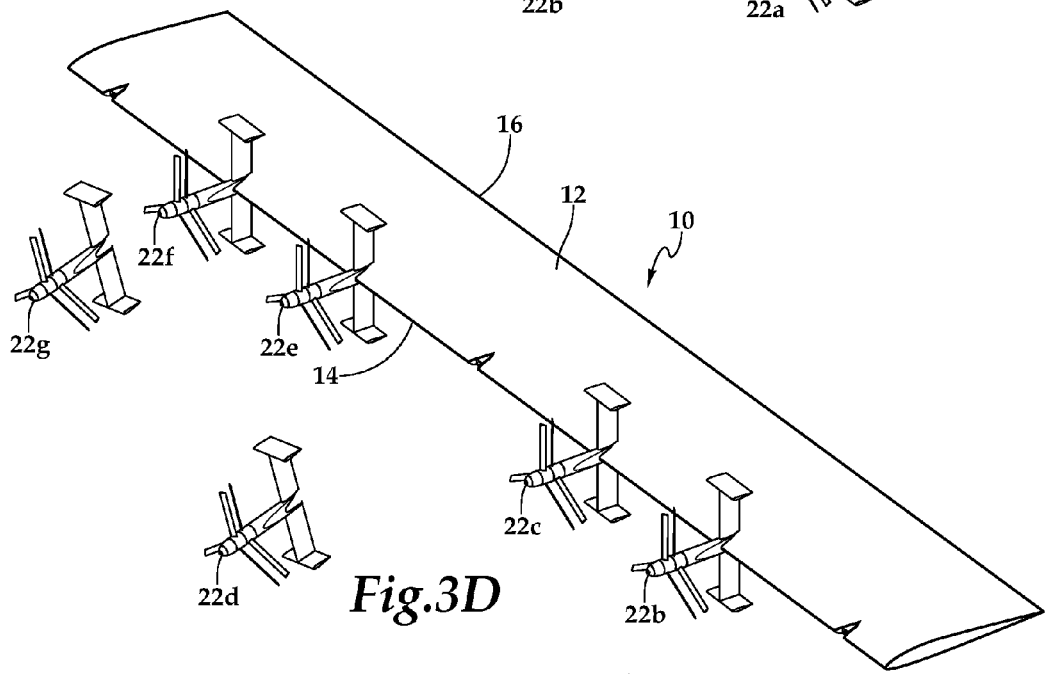

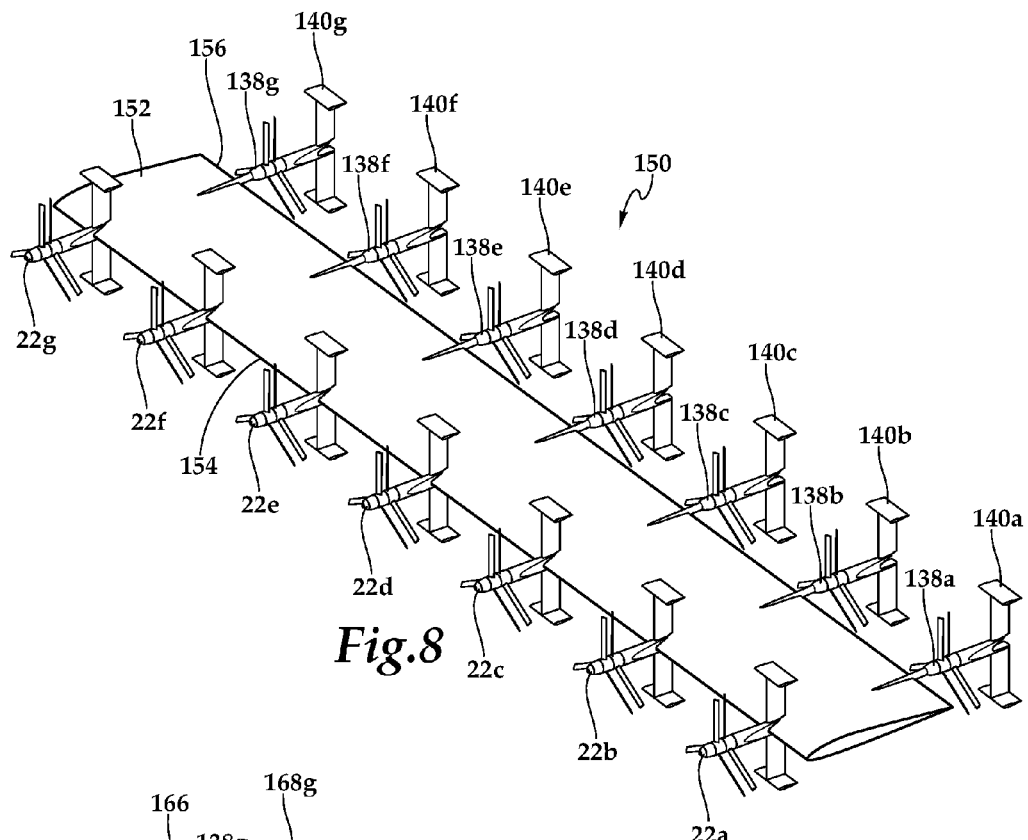
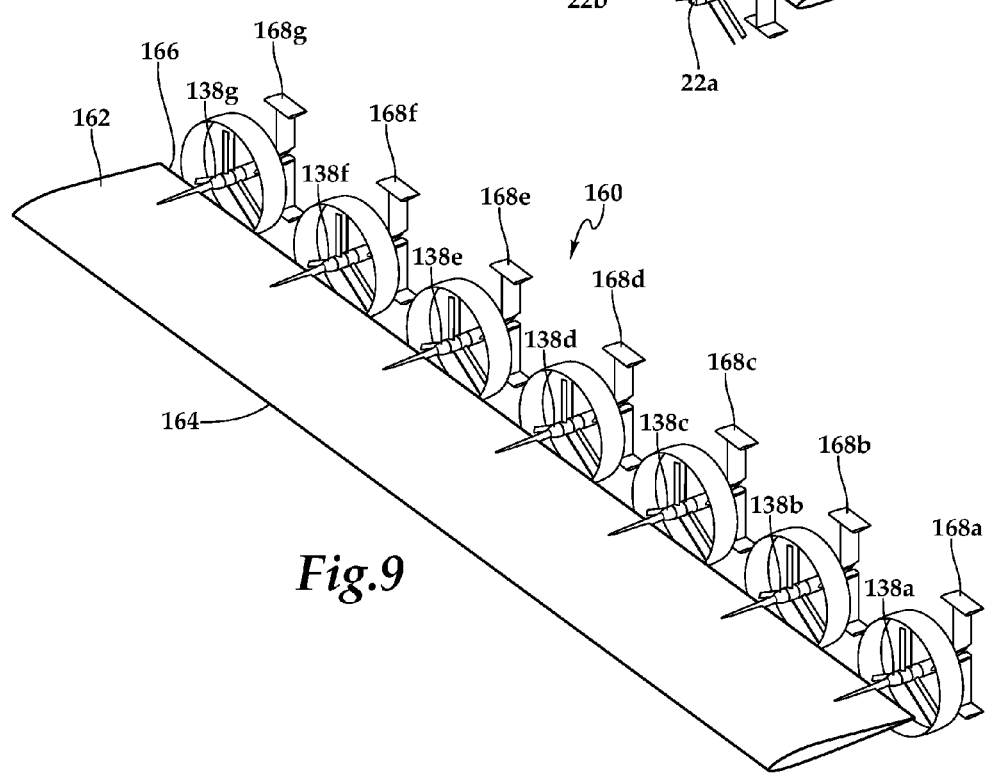

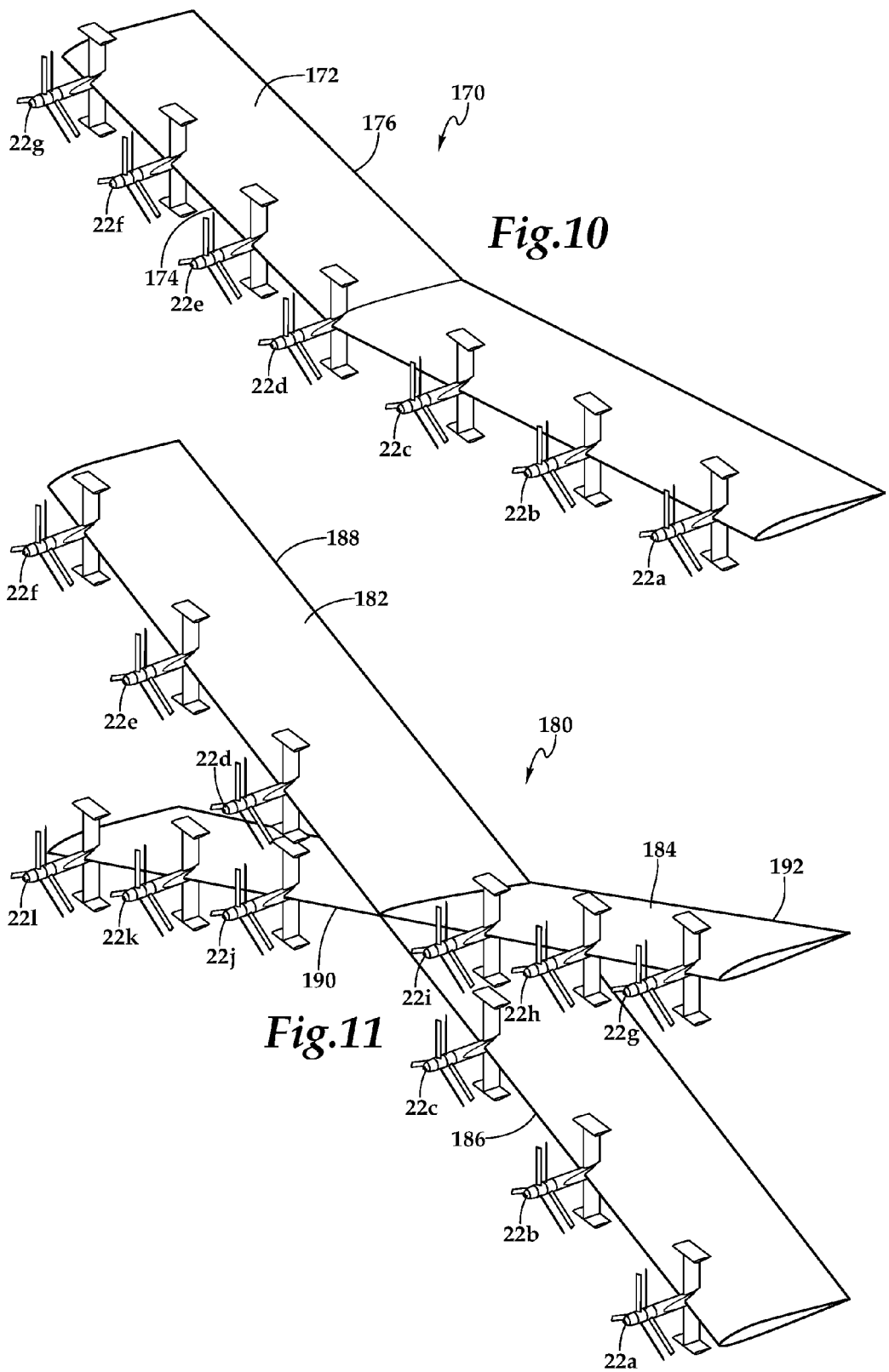

MUTUALLY SYMBIOTIC AIRCRAFT SYSTEMS

TECHNICAL FIELD OF THE DISCLOSURE

The present disclosure relates, in general, to mutually symbiotic aircraft systems and, in particular, to a high endurance wing member that provides a launch, recovery and resupplying platform to a plurality of unmanned aircraft systems that in turn provide propulsion to the wing member during connected flight operations.

BACKGROUND

Unmanned aircraft systems (UAS), also known as unmanned aerial vehicles (UAV) or drones, are self-powered aircraft that do not carry a human operator, uses aerodynamic forces to provide vehicle lift, are autonomously and/or remotely operated, may be expendable or recoverable and may carry lethal or nonlethal payloads. Unmanned aircraft systems are commonly used in military, commercial, scientific, recreational and other applications. For example, military applications include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Certain unmanned aircraft systems have been networked together such that they are capable of cooperating with one another and even exhibiting swarm behavior. Such swarm unmanned aircraft systems may have the ability to dynamically adapt responsive to changing conditions or parameters including the ability for group coordination, distributed control, distributed tactical group planning, distributed tactical group goals, distributed strategic group goals and/or fully autonomous swarming. Recent industry goals for deploying and recovering swarm unmanned aircraft systems include developing technologies and systems for enabling safe and reliable aerial launch and aerial recovery of unmanned aircraft systems.

SUMMARY

In a first aspect, the present disclosure is directed to an aircraft system that includes a wing member and a plurality of unmanned aircraft systems that are selectively connectable to the wing member. The wing member has a generally airfoil cross-section, a leading edge and a trailing edge. The unmanned aircraft systems have a connected flight mode while coupled to the wing member and an independent flight mode when detached from the wing member. In the connected flight mode, the unmanned aircraft systems are operable to provide propulsion to the wing member to enable flight. In addition, the unmanned aircraft systems are operable to be launched from the wing member to perform aerial missions in the independent flight mode and are operable to be recovered by the wing member and returned to the connected flight mode. Thereafter, in the connected flight mode, the unmanned aircraft systems are operable to be resupplied by the wing member.

In some embodiments, the unmanned aircraft systems may be selectively connectable to the leading edge of the wing member, the trailing edge and/or a lower surface of the wing member. In certain embodiments, a fuselage may extend generally perpendicular to the wing member. In some embodiments, the wing member may include a battery system operable to electrically recharge the unmanned aircraft systems in the connected flight mode. In such embodiments, the wing member may include a battery recharging system such as a solar energy collection system and/or a liquid fuel driven generator system. In certain embodiments, the wing member may include a flight control system that is operable to control the unmanned aircraft systems in the connected flight mode. Additionally, each of the unmanned aircraft systems may include a flight control system operable to control the respective unmanned aircraft system in the independent flight mode.

In some embodiments, the unmanned aircraft systems may provide vertical thrust for the aircraft system in a vertical takeoff and landing flight mode, in addition to providing forward thrust for the aircraft system in a forward flight mode. In other embodiments, the unmanned aircraft systems may provide forward thrust for the aircraft system in a runway takeoff and landing mode, in addition to providing forward thrust for the aircraft system in the forward flight mode. In certain embodiments, the unmanned aircraft systems may be magnetically coupled to the wing member in the connected flight mode. In some embodiments, electrical connections and/or data connections may be formed between the unmanned aircraft systems and the wing member in the connected flight mode.

In a second aspect, the present disclosure is directed to a method of operating an aircraft system including a wing member having a generally airfoil cross-section, a leading edge and a trailing edge and a plurality of unmanned aircraft systems that are selectively connectable with the wing member. The method includes providing forward thrust for the aircraft system with the unmanned aircraft systems in a connected flight mode; launching a first group of the unmanned aircraft systems from the wing member while maintaining a second group of the unmanned aircraft systems in the connected flight mode; performing aerial missions detached from the wing member with the first group of unmanned aircraft systems in an independent flight mode; recovering the first group of the unmanned aircraft systems with the wing member and reestablishing the connected flight mode; and resupplying the first group of the unmanned aircraft systems from the wing member after reestablishing the connected flight mode.

The method may also include relaunching the first group of the unmanned aircraft systems from the wing member after resupplying; launching the second group of the unmanned aircraft systems from the wing member while maintaining the first group of the unmanned aircraft systems in the connected flight mode; controlling the operation of the unmanned aircraft systems in the connected flight mode with a flight control system of the wing member; providing vertical thrust for a vertical takeoff and landing flight mode of the aircraft system with the unmanned aircraft systems in the connected flight mode; electrically recharging the first group of the unmanned aircraft systems from a battery system of the wing member; providing mission information to the first group of the unmanned aircraft systems from a mission control system of the wing member; magnetically coupling the first group of the unmanned aircraft systems to the wing member; establishing electrical communication between the first group of the unmanned aircraft systems and the wing member and/or establishing data communication between the first group of the unmanned aircraft systems and the wing member.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2J are schematic illustrations of an unmanned aircraft system for use as part of a mutually symbiotic aircraft system in accordance with embodiments of the present disclosure;

FIGS. 3A-3D are schematic illustrations of a mutually symbiotic aircraft system in a forward flight mode with unmanned aircraft systems performing various maneuvers in accordance with embodiments of the present disclosure;

FIG. 8 is a schematic illustration of a mutually symbiotic aircraft system in a forward flight mode in accordance with embodiments of the present disclosure;

FIG. 9 is a schematic illustration of a mutually symbiotic aircraft system in a forward flight mode in accordance with embodiments of the present disclosure;

FIG. 10 is a schematic illustration of a mutually symbiotic aircraft system in a forward flight mode in accordance with embodiments of the present disclosure;

FIG. 11 is a schematic illustration of a mutually symbiotic aircraft system in a forward flight mode in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
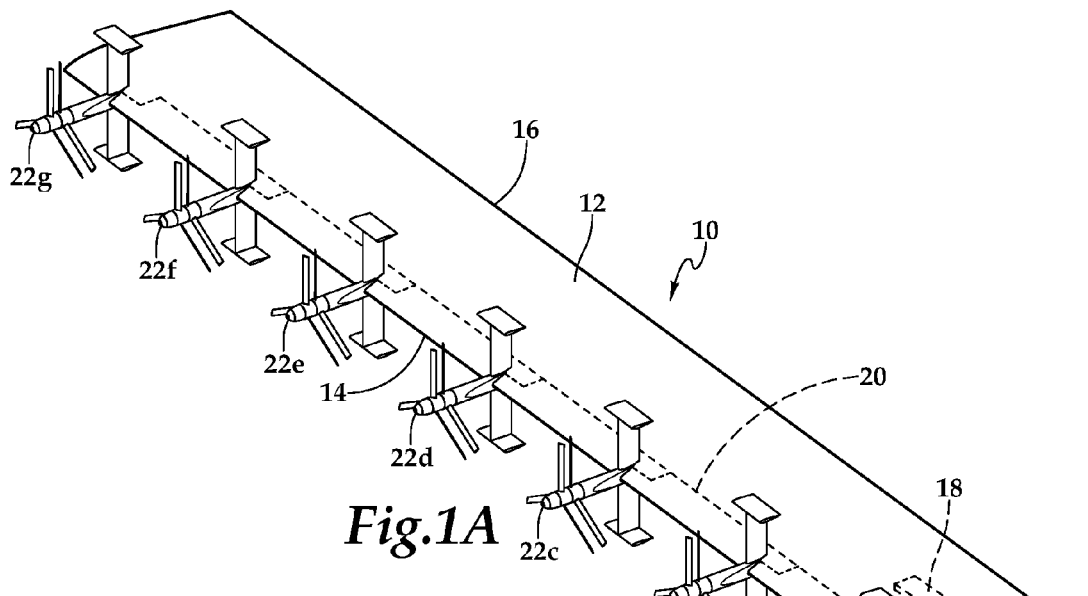
FIGS. 1A-1B are schematic illustrations of a mutually symbiotic aircraft system in a forward flight mode and in a vertical takeoff and landing flight mode, respectively, in accordance with embodiments of the present disclosure.
Figure 1B:
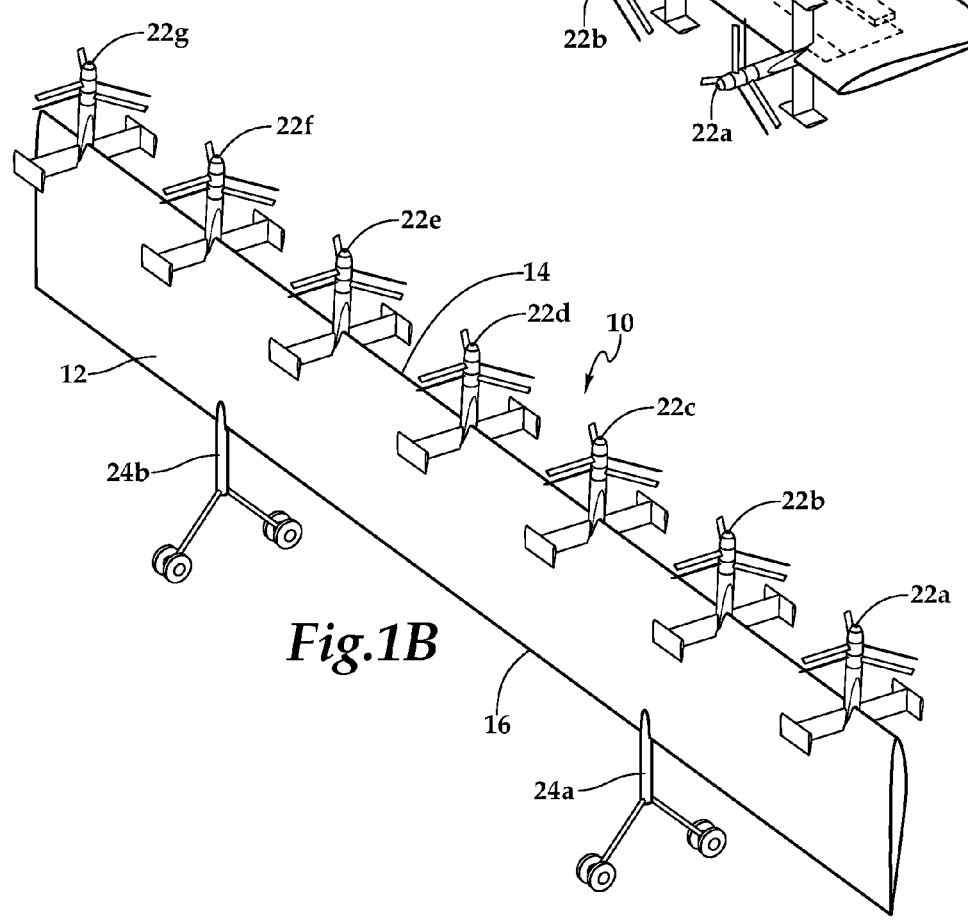

Referring to FIGS. 1A-1B in the drawings, a mutually symbiotic aircraft system 10 is depicted in a forward flight mode and a vertical takeoff and landing flight mode, respectively. In the illustrated embodiment, aircraft system 10 including a wing member 12 that preferably has an airfoil cross-section that generates lift responsive to the forward airspeed of aircraft system 10. Wing member 12 has a leading edge 14 and a trailing edge 16. Wing member 12 may be formed as a single member or may be a segmented wing member having multiple sections. Wing member 12 may be formed from any suitable material such as a high strength, lightweight material including metals or composites that may include fiberglass fabric, carbon fabric, fiberglass tape, carbon tape and combinations thereof. As discussed herein, wing member 12 preferably includes a central passageway operable to contain, for example, computer systems such as a flight control system 18 and a data communications network 20 (depicted in phantom in FIG. 1A), a battery system, an electrical communications network, liquid fuel tanks, an electrical generator system and other systems for supporting missions relating to aircraft system 10. In the illustrated embodiment, wing member 12 does not have an integral propulsion system, however, wing member 12 could alternatively support an integral propulsion system.

Propulsion for wing member 12 is provided by a plurality of unmanned aircraft systems depicted as seven independent unmanned aircraft systems 22a, 22b, 22c, 22d, 22e, 22f, 22g that are operably coupled to leading edge 14 of wing member 12. Each unmanned aircraft system 22a-22g may be connected to wing member 12 using a magnetic coupling, which may utilize permanent magnets and/or electromagnets having opposite poles to create a strong magnetic attraction therebetween. In one example, the tail section of each unmanned aircraft system 22a-22g may have extending therefrom a permanent magnet that is operable to mate with or dock within an electromagnetic coil of wing member 12 that is energized responsive to current flow controlled by the electrical system and flight control system 18 of wing member 12.

The illustrated configuration represents the connected flight mode of unmanned aircraft systems 22a-22g, wherein at least some of unmanned aircraft systems 22a-22g provide propulsion to wing member 12 to enable aircraft system 10 to fly. As best seen in FIG. 1A, unmanned aircraft systems 22a-22g are operable to provide forward thrust such that aircraft system 10 can operate in a forward flight mode. As best seen in FIG. 1B, unmanned aircraft systems 22a-22g are operable to provide vertical thrust such that aircraft system 10 can operate in a vertical takeoff and landing flight mode. Aircraft system 10 may operate in orientations between vertical takeoff and landing fight mode and forward flight mode and is operable to transition from vertical takeoff and landing fight mode to forward flight mode as well as from forward flight mode to vertical takeoff and landing fight mode. As illustrated, ground operations of aircraft system 10 may be supported by struts 24a, 24b that may be permanently attached to wing member 12 and preferably stowed during flight. Alternatively, struts 24a, 24b may be jettisonable from wing member 12 after takeoff or may serve as ground support only such that aircraft system 10 separates from struts 24a, 24b upon takeoff.

In the connected flight mode, the operation of unmanned aircraft systems 22a-22g is preferably controlled by flight control system 18 of wing member 12. As illustrated, flight control system 18 may be a digital flight control system disposed with wing member 12 and may be implemented as a redundant or triply redundant system to improve the overall safety and reliability of aircraft system 10 in the event of a failure in flight control system 18. Flight control system 18 preferably includes non-transitory computer readable storage media including a set of computer instructions executable by processors for controlling the operation of aircraft system 10 including unmanned aircraft systems 22a-22g when in connected flight mode. Flight control system 18 may be implemented on one or more general-purpose computers, special purpose computers or other machines with memory and processing capability. For example, flight control system 18 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 18 may be a microprocessor-based system operable to execute program code in the form of machine-executable instructions. In addition, flight control system 18 may be selectively connectable to other computer systems via a proprietary encrypted network, a public encrypted network, the Internet or other suitable communication network that may include both wired and wireless connections.

As illustrated, flight control system 18 communicates via data communications network 20 with the flight control systems of each unmanned aircraft systems 22a-22g such that each unmanned aircraft systems 22a-22g may be individually and independently controlled and operated. Flight control system 18 may autonomously control all aspects of flight operations for aircraft system 10. Alternatively or additionally, flight control system 18 may be operable to communicate with remote systems via a wireless communications protocol such that some or all aspects of flight operations for aircraft system 10 may be remotely controlled. Unmanned aircraft systems 22a-22g may be multi-role UAS having a precision digital flight control and navigation system and the ability for swarm networking and cooperation. In various implementations, unmanned aircraft systems 22a-22g are self-powered, do not carry a human operator, use aerodynamic forces to provide vehicle lift, are autonomously and/or remotely operated, may be expendable or recoverable and may carry lethal or nonlethal payloads. Unmanned aircraft systems 22a-22g may be used in military, commercial, scientific, recreational and other applications.

In addition, groups of unmanned aircraft systems 22a-22g, may be networked together such that they are capable of cooperating with one another and exhibiting swarm behavior including, for example, the ability to dynamically adapt responsive to changing conditions or parameters, the ability for group coordination, distributed control, distributed tactical group planning, distributed tactical group goals, distributed strategic group goals and/or fully autonomous swarming. In one example, certain of unmanned aircraft systems 22a-22g could be reconnaissance aircraft while other of unmanned aircraft systems 22a-22g could be attack aircraft. As discussed herein, unmanned aircraft systems 22a-22g, using internal flight control systems and networked communications, could cooperate together during missions detached from wing member 12 then periodically reconnect with wing member 12 to exchange information such as data collected during the mission and instructions for the next mission as well as to recharge batteries within unmanned aircraft systems 22a-22g.

Figure 2A:
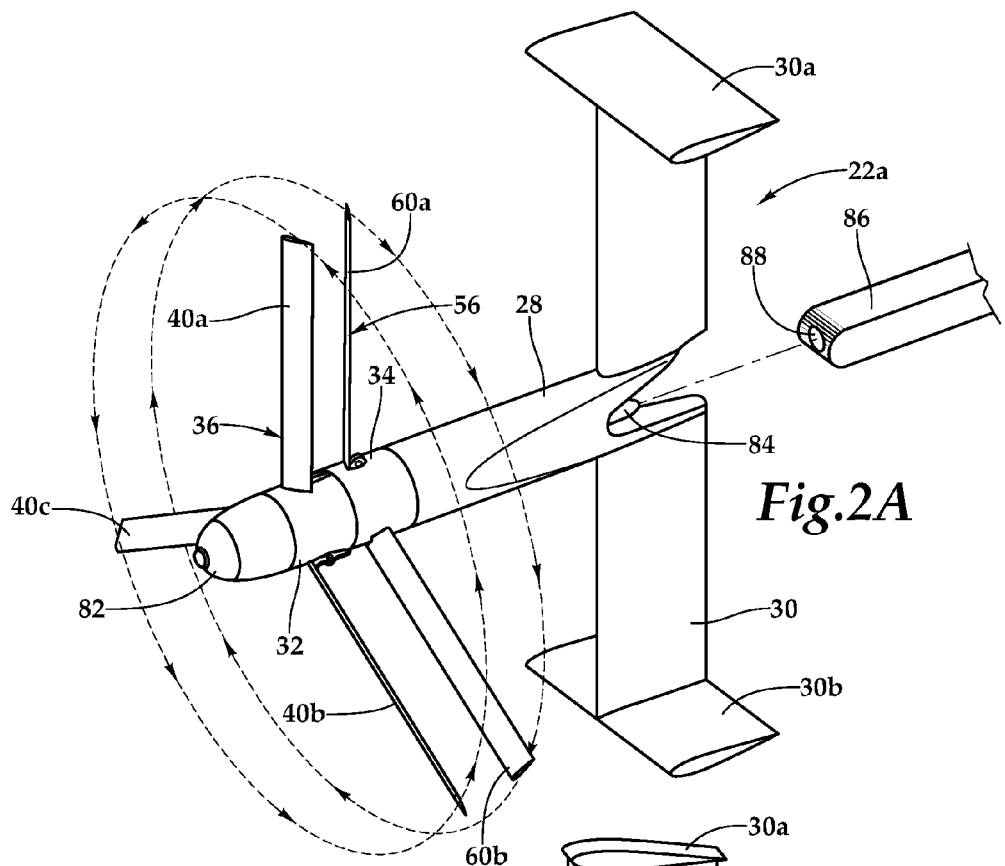
Figure 2B:
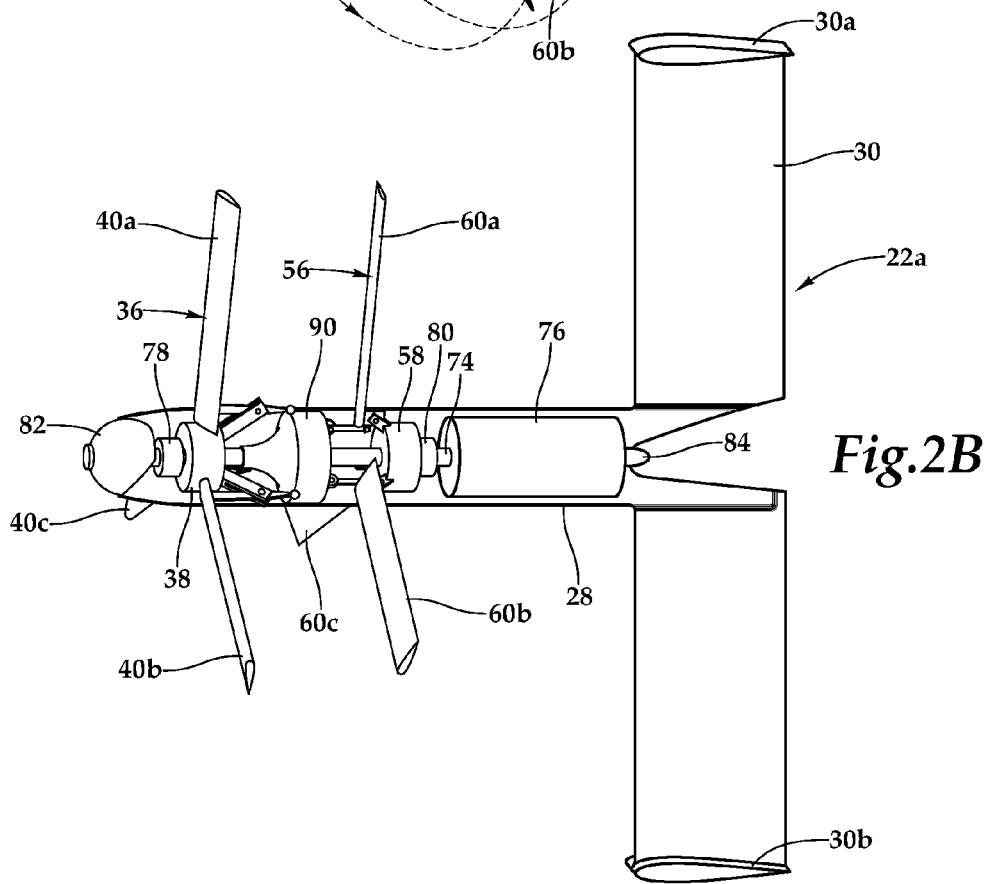
Figure 2C:
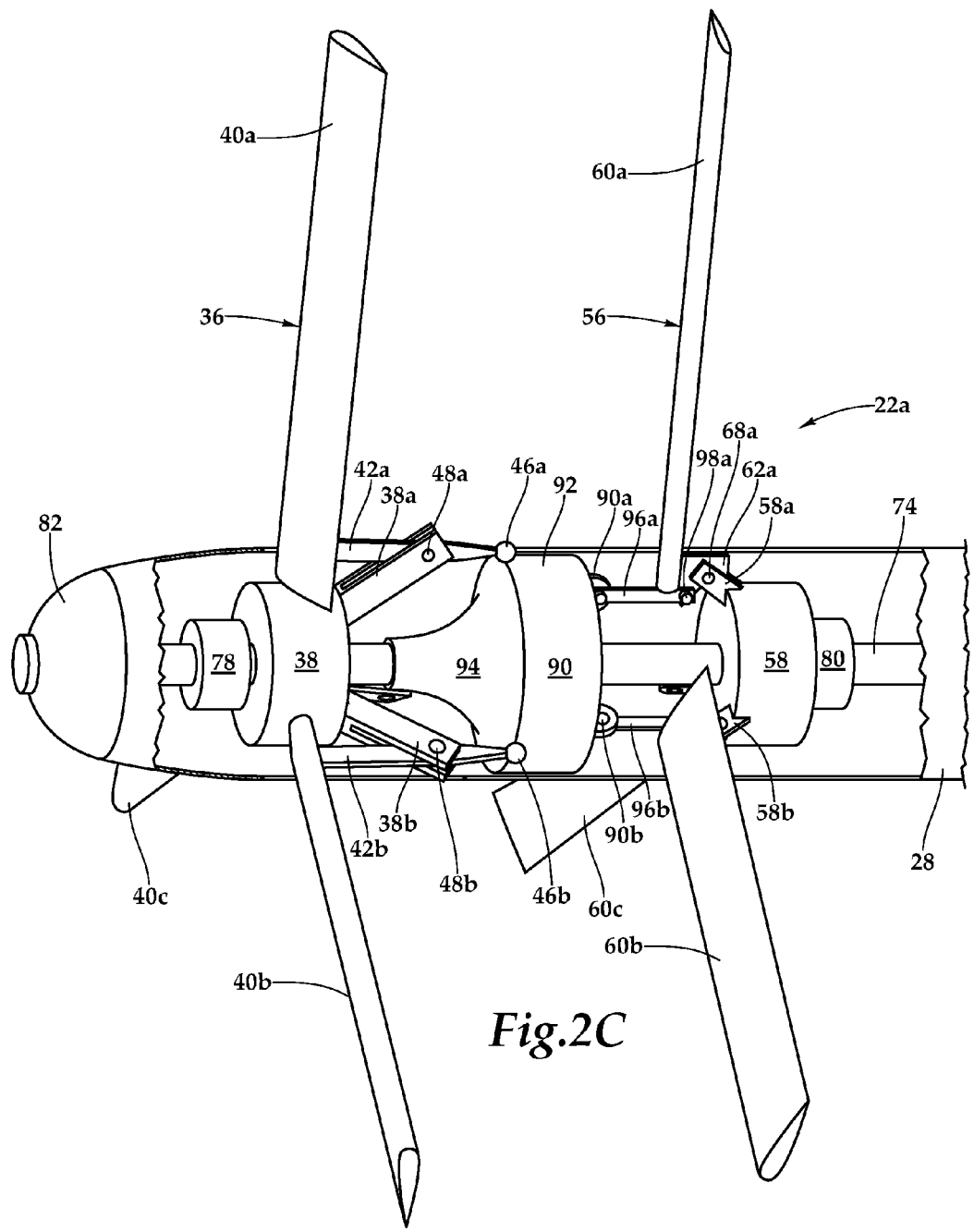

Referring next to FIGS. 2A-2C in the drawings, enlarged views of unmanned aircraft system 22a are depicted. In the illustrated embodiment, unmanned aircraft system 22a including a generally cylindrical fuselage 28 and a tail section 30 including stabilizers 30a, 30b. Fuselage 28 includes a forward rotor station 32 and an aft rotor station 34. A forward rotor assembly 36 is positioned proximate forward rotor station 32. As best seen in FIG. 2C, forward rotor assembly 36 includes a rotor hub 38 having three extensions, only extensions 38a, 38b being visible in the figures. Forward rotor assembly 36 also includes three rotor blades 40a, 40b, 40c each of which has a respective support arm, only support arms 42a, 42b being visible in the figures. Referring additionally to FIG. 2I, rotor blade 40a is disclosed in greater detail. Rotor blade 40a is substantially similar to rotor blades 40b, 40c therefore, for sake of efficiency, certain features will be disclosed only with regard to rotor blade 40a. One having ordinary skill in the art, however, will fully appreciate an understanding of rotor blades 40b, 40c based upon the disclosure herein of rotor blade 40a. As illustrated, support arm 42a extends generally perpendicularly from a lower surface of rotor blade 40a. Support arm 42a includes an opening 44a and a bearing 46a. Opening 44a is operable to receive a pin therethrough to pivotably couple support arm 42a to extension 38a forming joint 48a. A similar joint is formed between each support arm and the respective extension, only joints 48a, 48b being visible in the figures. In the illustrated embodiment, bearing 46a has a generally spherical surface and may be a static bearing or a rotatable bearing, only bearings 46a, 46b being visible in the figures. Support arm 42a includes a length 50a from the lower surface of rotor blade 40a to the center of opening 44a and a length 52a from the center of opening 44a to the end of bearing 46a.

Returning to FIGS. 2A-2C in the drawings, an aft rotor assembly 56 is positioned proximate aft rotor station 34. As best seen in FIG. 2C, aft rotor assembly 56 includes a rotor hub 58 having three extensions, only extensions 58a, 58b being visible in the figures. Aft rotor assembly 56 also includes three rotor blades 60a, 60b, 60c each of which has a respective arm, only arm 62a being visible in the figures. Referring additionally to FIG. 2J, rotor blade 60a is disclosed in greater detail. Rotor blade 60a is substantially similar to rotor blades 60b, 60c therefore, for sake of efficiency, certain features will be disclosed only with regard to rotor blade 60a. One having ordinary skill in the art, however, will fully appreciate an understanding of rotor blades 60b, 60c based upon the disclosure herein of rotor blade 60a. As illustrated, arm 62a extends generally perpendicularly from a lower surface of rotor blade 60a. Arm 62a includes an opening 64a and a tab 66a having an opening 70a. Opening 64a is operable to receive a pin therethrough to pivotably couple arm 62a to extension 58a forming joint 68a. A similar joint is formed between each arm and the respective extension, only joint 68a being visible in the figures. In the illustrated embodiment, tab 66a extends from arm 62a at an angle of approximately 45 degrees. Arm 62a includes a length 72a from the lower surface of rotor blade 60a to the center of opening 64a.

Returning again to FIGS. 2A-2C in the drawings, forward rotor assembly 36 and aft rotor assembly 56 are operable to rotate about a fixed shaft 74 that has a central passageway that contains a wiring harness including electrical and data communication lines. For example, electrical communication lines supply battery power and data communication lines supply commands from electronics package 76 to a forward motor 78 and an aft motor 80 to enable independent operation of forward rotor assembly 36 and aft rotor assembly 56, as discussed herein, including operating forward rotor assembly 36 and aft rotor assembly 56 in counter rotation as indicated by the motion arrows in FIG. 2A. Electronics package 76 includes one or more rechargeable batteries, the digital flight control system and other computing systems required for the specific missions conducted by unmanned aircraft system 22a. In the illustrated example, unmanned aircraft system 22a is a surveillance drone including a sensor system 82 located in the nose of fuselage 28. Sensor system 82 may include positioning sensors, attitude sensors, speed sensors, environmental sensors, temperature sensors, target sensors and the like. Alternatively or additionally, sensor system 82 may include optical surveillance systems such as a spherical camera and/or a light detection and ranging module that may be pointed at a target of interest. In this example, both electrical and data communication lines will pass from electronics package 76 to sensor system 82 via the central passageway of shaft 74.

Electronics package 76 preferably includes computing elements such as non-transitory computer readable storage media that include computer instructions executable by processors for controlling the flight operation of unmanned aircraft system 22a and surveillance operations of unmanned aircraft system 22a. The computing elements may be implemented on one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may include microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

As best seen in FIG. 2A, unmanned aircraft system 22a including a docking assembly 84 operably coupled to electronics package 76. In the illustrated embodiment, docking assembly 84 included a magnetic element, at least one electrical connection and at least one data connection. Docking assembly 84 is operable to couple with a docking probe 86 that may be extended from wing member 12 during docking operations. In the illustrated embodiment, docking probe 86 is a semi-rigid member that may be extended from wing member 12 (see FIG. 3C) and may be formed from fiberglass or carbon. Linear actuators may be operable to extend and retract docking probe 86 from wing member 12. In some embodiments, docking probe 86 may include a conical receptacle to aid in guiding docking assembly 84 into connection with docking probe 86. Docking probe 86 preferably includes a magnetic element, at least one electrical connection and at least one data connection. In one embodiment, docking assembly 84 includes a permanent magnet having a passageway therethrough for containing electrical and data communication lines that are coupled with the at least one electrical connection and the at least one data connection of docking assembly 84. Docking assembly 84 is designed to be received within an opening 88 of docking probe 86. Disposed about opening 88, docking probe 86 includes an electromagnetic coil that is energized responsive to current flow controlled by the electrical system and flight control system 18 of wing member 12. A strong magnetic connection may be achieved in this manner, which may be maintained to prevent separation of unmanned aircraft system 22a from wing member 12. Alternatively or additionally, a mechanical locking member or other system may be used to securably couple unmanned aircraft system 22a to wing member 12 during connected flight mode.

During or after docking assembly 84 is received by docking probe 86, the electrical and data connections are formed therebetween to enable wing member 12 to resupply unmanned aircraft system 22a including, for example, recharging the batteries in electronics package 76 and providing additional or new data to the flight control system and mission control system of unmanned aircraft system 22a. In addition, the flight control system and mission control system of unmanned aircraft system 22a may upload data to computer systems of wing member 12. Even though unmanned aircraft system 22a has been depicted and described as having a docking assembly in a particular location that has particular functionality, it should understood by those having ordinary skill in the art that an unmanned aircraft system of the present disclosure could have a docking assembly in alternate locations, such as extending forward from the nose, and/or a docking assembly with other capabilities, such as having nonmagnetic coupling capabilities. In addition, forming the electrical and data connections between an unmanned aircraft system of the present disclosure and wing member 12 may be independent of the process of coupling the docking assembly with the docking probe. Also, an unmanned aircraft system of the present disclosure could dock with a wing member without the use of a docking probe that extends from the wing member.

As best seen in FIG. 2C, a sequencing cam 90 is positioned between forward rotor assembly 36 and aft rotor assembly 56. Sequencing cam 90 is disposed on and is rotatable about fixed shaft 74. In the illustrated embodiment, sequencing cam 90 has a generally cylindrical shelf 92 and a guide surface 94. Guide surface 94 has a profile in the form of an arc corresponding to approximately 90 degrees of a circle having a radius approximately equal to the length 52a of support arm 42a. This shape enables the bearings of the support arms to remain in contact with guide surface 94 during folding and rising operations of rotor blades 40a, 40b, 40c, as discussed herein. Sequencing cam 90 is coupled to and rotates with aft rotor assembly 56. In the illustrated embodiment, sequencing cam 90 includes three lugs, only lugs 90a, 90b being visible in the figures, that are each rotatably coupled to one end of a linkage, only linkages 96a, 96b being visible in the figures. The other end of each linkage is rotatably coupled to a respective tab of an arm of rotor blades 60a, 60b, 60c forming a joint therebetween, only joint 98a being visible in the figures.

Figure 2D:
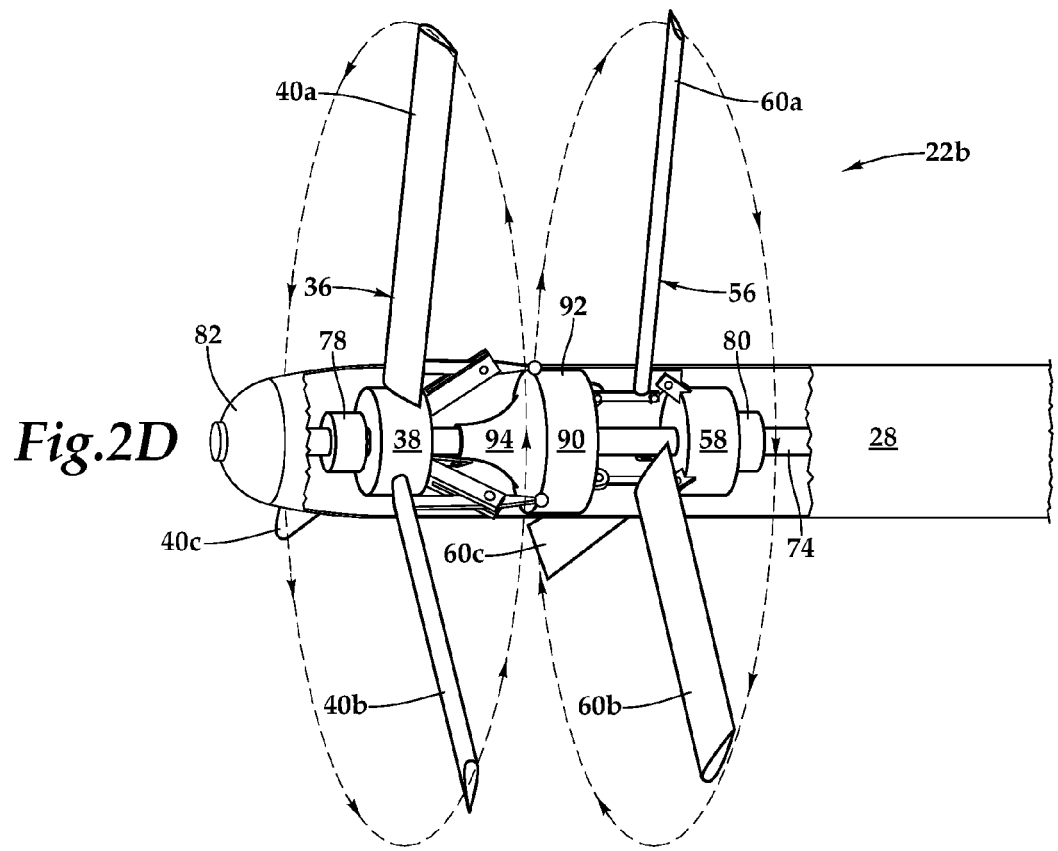

The rotor sequencing operation of unmanned aircraft system 22b will now be described with reference to FIGS. 2D-2H. In FIG. 2D, unmanned aircraft system 22b is preferably in connected flight mode with wing member 12 after, for example, transitioning to a forward flight mode from a vertical takeoff and landing flight mode. As the thrust requirement for forward flight is reduced compared to vertical takeoff, propulsion from all of unmanned aircraft systems 22a-22g (see FIG. 3A) may no longer be required. Thus, to improve the flight efficiency of aircraft system 10, certain of the unmanned aircraft systems 22a-22g, such as unmanned aircraft system 22b, may be shut down. As illustrated in FIG. 2D, forward motor 78 is rotating forward rotor assembly 36 in a counter clockwise direction as viewed from in front of unmanned aircraft system 22b and as indicated by the motion arrows. At the same time, aft motor 80 is rotating aft rotor assembly 56 in a clockwise direction as viewed from in front of unmanned aircraft system 22b and as indicated by the motion arrows.

As rotor blades 40a, 40b, 40c have a positive angle of attack when rotated in the counter clockwise direction, rotor blades 40a, 40b, 40c are aerodynamically actuated to an operating or deployed configuration in which rotor blades 40a, 40b, 40c extend generally radially outward relative to fuselage 28. Likewise, as rotor blades 60a, 60b, 60c have a positive angle of attack when rotated in the clockwise direction, rotor blades 60a, 60b, 60c are aerodynamically actuated to an operating or deployed configuration in which rotor blades 60a, 60b, 60c extend generally radially outward relative to fuselage 28. As long as forward motor 78 rotates forward rotor assembly 36 above a predetermined speed, rotor blades 40a, 40b, 40c remain in the deployed configuration. Similarly, as long as aft motor 80 rotates aft rotor assembly 56 above a predetermined speed, rotor blades 60a, 60b, 60c remain in the deployed configuration. In addition, as long as rotor blades 60a, 60b, 60c are in the deployed configuration, rotor blades 40a, 40b, 40c remain in the deployed configuration even if forward motor 78 ceases to rotate forward rotor assembly 36 above the predetermined speed as cylindrical shelf 92 of sequencing cam 90 props the support arms of rotor blades 40a, 40b, 40c and prevents rotor blades 40a, 40b, 40c from pivoting relative to rotor hub 38 as the bearings are radially supported by cylindrical shelf 92.

Figure 2E:
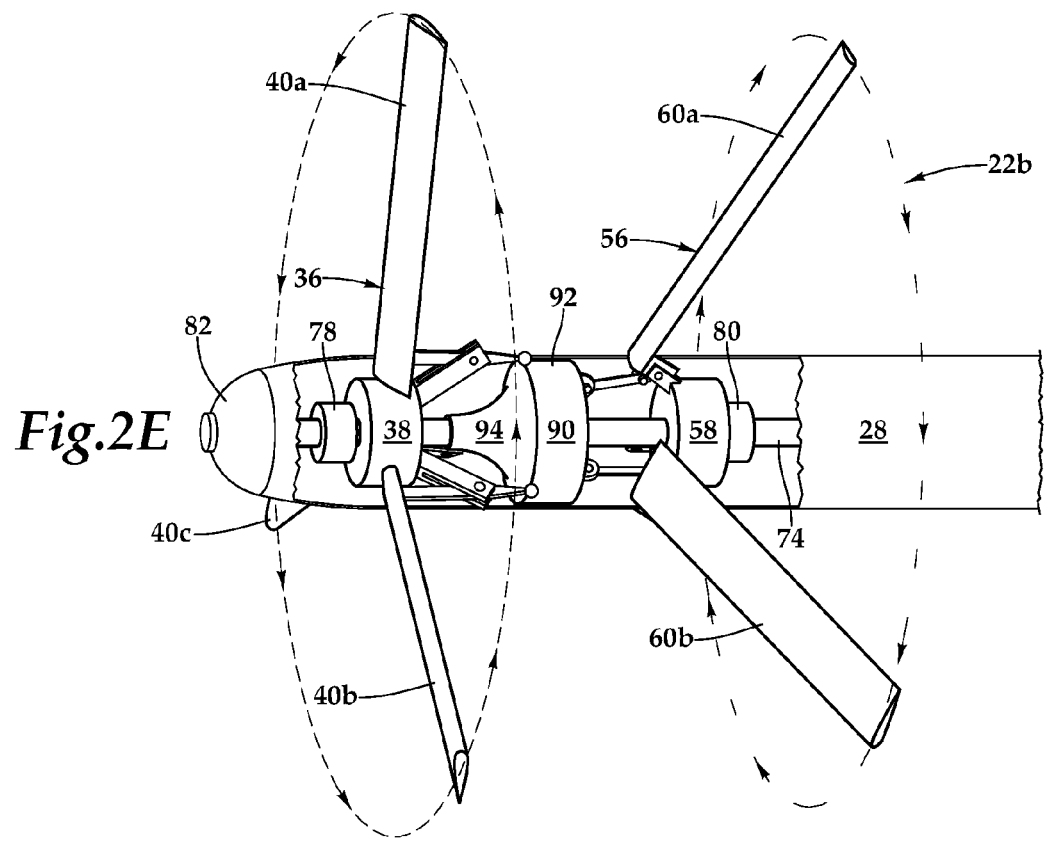

When it is desired to shut down unmanned aircraft system 22b, as illustrated in FIG. 2E, power to aft motor 80 is shut down causing rotation of aft rotor assembly 56 to slow down, as indicated by the reduced number of motion arrows, which in turn causes rotor blades 60a, 60b, 60c to begin folding as the aerodynamic forces are not longer sufficient to maintain rotor blades 60a, 60b, 60c in the deployed configuration. As rotor blades 60a, 60b, 60c fold, rotor blades 60a, 60b, 60c pivot relative to rotor hub 58 at the respective joints therebetween. The pivoting motion is coupled to sequencing cam 90 via the respective linkages. In the initial phase of pivoting of rotor blades 60a, 60b, 60c, sequencing cam 90 remains substantially fixed translationally relative to fixed shaft 74 due to the path taken by the linkages and as indicated by the lack of translationally movement of sequencing cam 90 between FIGS. 2D and 2E. Thus, sequencing cam 90 continues to prop the support arms of rotor blades 40a, 40b, 40c and prevent rotor blades 40a, 40b, 40c from pivoting relative to rotor hub 38 as the bearings remain radially supported by cylindrical shelf 92.

Figure 2F:
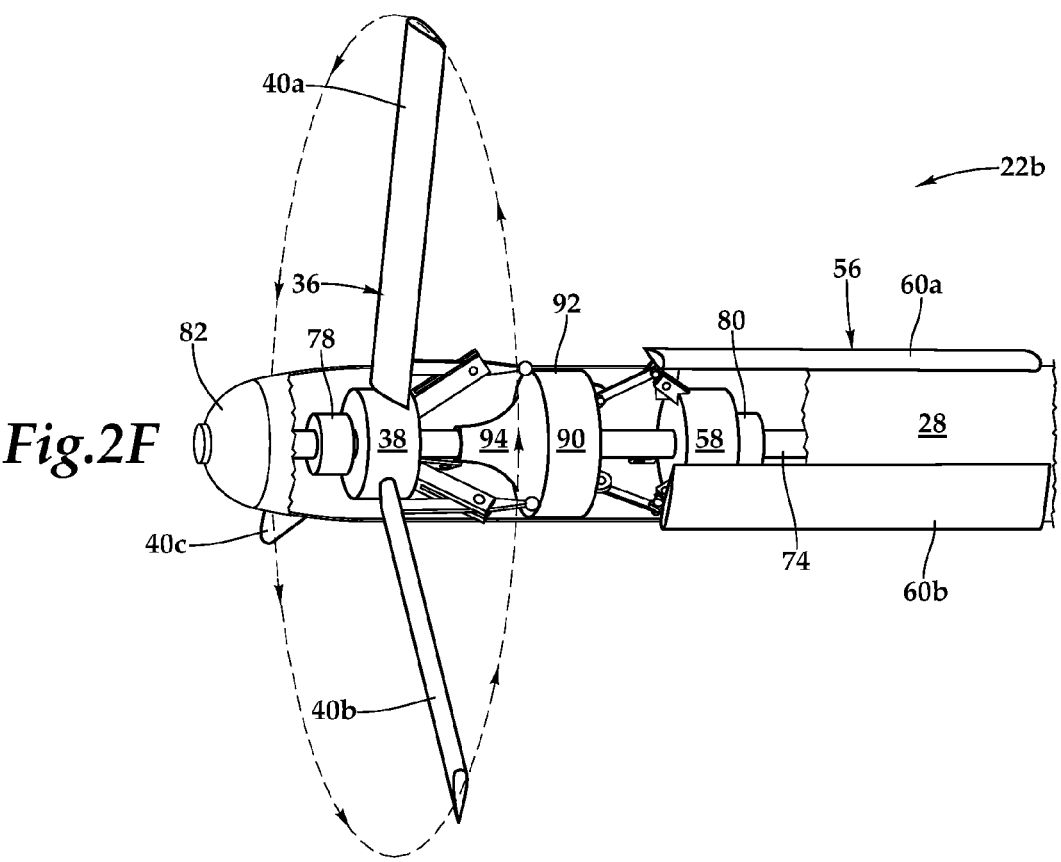

As illustrated in FIG. 2F, after power to aft motor 80 is shut down, rotation of aft rotor assembly 56 comes to a stop and rotor blades 60a, 60b, 60c have folded to a stowed configuration extending generally parallel with fuselage 28. During folding, rotor blades 60a, 60b, 60c continue to pivot relative to rotor hub 58 at the respective joints therebetween, which pivoting motion is coupled to sequencing cam 90 via the respective linkages. In the finishing phase of pivoting of rotor blades 60a, 60b, 60c, sequencing cam 90 translates relative to fixed shaft 74 due to the path taken by the linkages and as indicated by the difference in position of sequencing cam 90 between FIGS. 2E and 2F. This motion may be described as translating sequencing cam 90 from an extended orientation to a retracted orientation wherein sequencing cam 90 no longer props the support arms of rotor blades 40a, 40b, 40c or prevents rotor blades 40a, 40b, 40c from pivoting relative to rotor hub 38 as the bearings are no longer radially supported by cylindrical shelf 92. It is noted that as long as forward motor 78 rotates forward rotor assembly 36 above a predetermined speed, rotor blades 40a, 40b, 40c remain in the deployed configuration as indicated by the motion arrows in FIG. 2F.

Figure 2G:
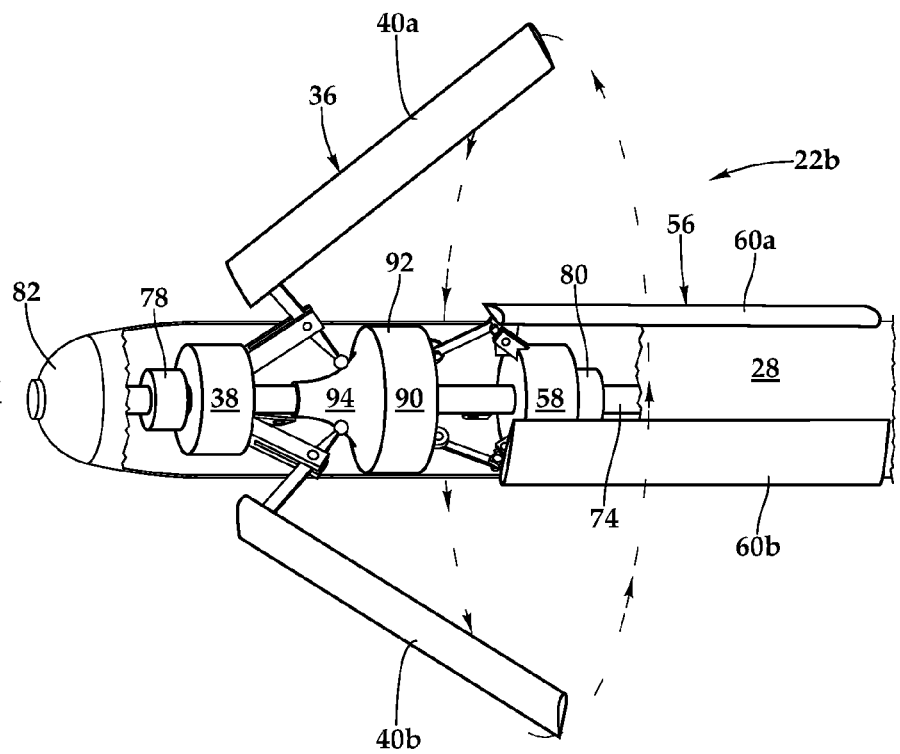

As illustrated in FIG. 2G, power to forward motor 78 is shut down causing rotation of forward rotor assembly 36 to slow down, as indicated by the reduced number of motion arrows, which in turn causes rotor blades 40a, 40b, 40c to begin folding as the aerodynamic forces are not longer sufficient to maintain rotor blades 40a, 40b, 40c in the deployed configuration and as sequencing cam 90 no longer props the support arms of rotor blades 40a, 40b, 40c. As rotor blades 40a, 40b, 40c fold, rotor blades 40a, 40b, 40c pivot relative to rotor hub 38 at the respective joints therebetween. Preferably, the bearings on the end of the support arms of rotor blades 40a, 40b, 40c remain in contact with guide surface 94 of sequencing cam 90 during the pivoting of rotor blades 40a, 40b, 40c.

As illustrated in FIG. 2H, after power to forward motor 78 is shut down, rotation of forward rotor assembly 36 has come to a stop and rotor blades 40a, 40b, 40c have folded to a stowed configuration extending generally parallel with fuselage 28. During folding, rotor blades 40a, 40b, 40c continue to pivot relative to rotor hub 38 at the respective joints therebetween and the bearings remain in contact with guide surface 94 of sequencing cam 90. In this manner, rotor blades 40a, 40b, 40c and rotor blades 60a, 60b, 60c avoid interference when rotor blades 40a, 40b, 40c and rotor blades 60a, 60b, 60c are in the deployed configurations and during folding operations. As illustrated, due to the difference in length 50a of rotor blades 40a, 40b, 40c and length 72a of rotor blades 60a, 60b, 60c, rotor blades 40a, 40b, 40c occupy a radial space that is different than the radial space occupied by rotor blades 60a, 60b, 60c and namely a radial space having a greater radial distance from fuselage 28. In this manner, rotor blades 40a, 40b, 40c and rotor blades 60a, 60b, 60c avoid interference when rotor blades 40a, 40b, 40c and rotor blades 60a, 60b, 60c are in the stowed configurations.

When it is desired to restart unmanned aircraft system 22b, as illustrated in FIG. 2G, power to forward motor 78 is commenced causing rotation of forward rotor assembly 36 to begin, as indicated by the motion arrows, which in turn causes rotor blades 40a, 40b, 40c to begin to rise responsive to aerodynamic actuation of rotor blades 40a, 40b, 40c. As rotor blades 40a, 40b, 40c rise, rotor blades 40a, 40b, 40c pivot relative to rotor hub 38 at the respective joints therebetween with the bearings in contact with guide surface 94 of sequencing cam 90. As the speed of forward rotor assembly 36 increases and exceeds a predetermined speed, rotor blades 40a, 40b, 40c complete the transition from the stowed configuration to the deployed configuration, as best seen in FIG. 2F. As rotor blades 40a, 40b, 40c complete the rise, rotor blades 40a, 40b, 40c pivot relative to rotor hub 38 at the respective joints therebetween with the bearings remaining in contact with guide surface 94 of sequencing cam 90 until rotor blades 40a, 40b, 40c reach the deployed configuration at which time the bearings may loose contact with guide surface 94 of sequencing cam 90.

As illustrated in FIG. 2E, power to aft motor 80 may now commence causing rotation of aft rotor assembly 56, as indicated by the motion arrows, which in turn causes rotor blades 60a, 60b, 60c to begin rising responsive to aerodynamic actuation. As rotor blades 60a, 60b, 60c rise, rotor blades 60a, 60b, 60c pivot relative to rotor hub 58 at the respective joints therebetween. The pivoting motion is coupled to sequencing cam 90 via the linkages causing sequencing cam 90 to translate forward relative to fixed shaft 74. This motion may be described as translating sequencing cam 90 from the retracted orientation to the extended orientation wherein sequencing cam 90 now props the support arms of rotor blades 40a, 40b, 40c and prevents rotor blades 40a, 40b, 40c from pivoting relative to rotor hub 38 as the bearings are radially supported by cylindrical shelf 92.

As the speed of aft rotor assembly 56 increases and exceeds a predetermined speed, rotor blades 60a, 60b, 60c complete the transition from the stowed configuration to the deployed configuration, as best seen in FIG. 2D. As rotor blades 60a, 60b, 60c complete the rise, rotor blades 60a, 60b, 60c pivot relative to rotor hub 58 at the respective joints therebetween. The pivoting motion is coupled to sequencing cam 90, however, due to the path taken by the linkages, sequencing cam 90 experience little or no additional translationally movement as indicated by the similarity in location of sequencing cam 90 in FIGS. 2D and 2E. In the deployed configuration of rotor blades 60a, 60b, 60c, sequencing cam 90 continues to prop the support arms of rotor blades 40a, 40b, 40c and prevent rotor blades 40a, 40b, 40c from pivoting relative to rotor hub 38 as the bearings are radially supported by cylindrical shelf 92. In this manner, rotor blades 40a, 40b, 40c and rotor blades 60a, 60b, 60c avoid interference when rotor blades 40a, 40b, 40c and rotor blades 60a, 60b, 60c are transitioned from the stowed configurations to the deployed configurations.

Referring now to FIGS. 3A-3D of the drawings, therein is depicted flight scenarios of aircraft system 10. As illustrated, aircraft system 10 including a wing member 12 having a leading edge 14, a trailing edge 16 and an airfoil cross-section that generates lift responsive to the forward airspeed of aircraft system 10. As discussed herein, wing member 12 houses computer systems such as a flight control system 18 and a data communications network 20 (see FIG. 1A), a battery system, an electrical communications network, liquid fuel tanks and an electrical generator system (see FIG. 4) and other systems for supporting missions relating to aircraft system 10. Propulsion for wing member 12 is provided by unmanned aircraft systems 22a-22g that are operably coupled to leading edge 14 of wing member 12. The illustrated configuration represents the connected flight mode of unmanned aircraft systems 22a-22g, wherein at least some of unmanned aircraft systems 22a-22g provide propulsion to wing member 12 to enable aircraft system 10 to fly.

Figure 3A:
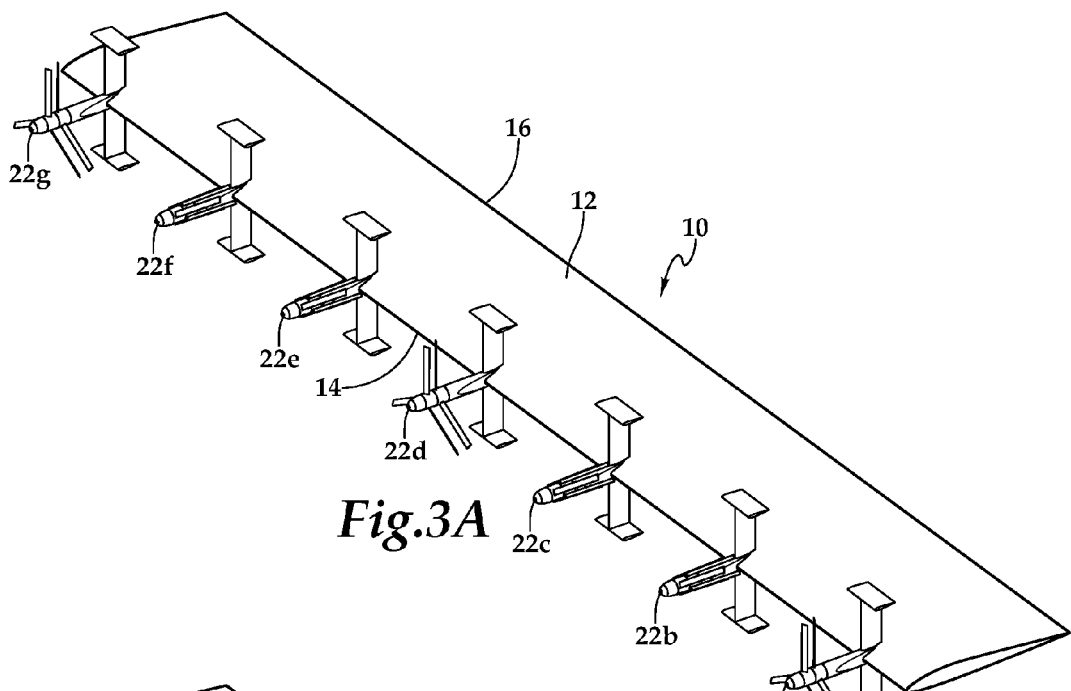

As discussed herein, aircraft system 10 is designed to enable high endurance flights by carrying an energy source and by generating additional energy with wing member 12. This enables wing member 12 to supply and resupply energy to unmanned aircraft systems 22a-22g such that unmanned aircraft systems 22a-22g can perform numerous and sequential missions detached from wing member 12. In addition, while in connected flight mode, unmanned aircraft systems 22a-22g are operable to provide propulsion to wing member 12. To further enable high endurance flights of aircraft system 10, when maximum thrust is not required, certain of unmanned aircraft systems 22a-22g may be shut down to conserve energy. As best seen in FIG. 3A, unmanned aircraft systems 22a, 22d, 22g are operating to provide forward thrust for aircraft system 10 while unmanned aircraft systems 22b, 22c, 22e, 22f have been shut down using, for example, the rotor sequencing protocol discussed herein to avoid rotor blade interference. Flight control system 18 of wing member 12 is operable to determine which and how many of the unmanned aircraft systems 22a-22g should be operated during forward flight mode based upon mission parameters, charge status of the unmanned aircraft systems, environmental conditions and the like. As discussed herein, in connected flight mode, all aspects of the operation of unmanned aircraft systems 22a-22g are preferably controlled by flight control system 18 of wing member 12. Such command and control information is communicated to unmanned aircraft systems 22a-22g via data communications network 20 of wing member 12 (see FIG. 1A). It is noted that flight control system 18 may autonomously control all aspects of flight operations for aircraft system 10. Alternatively or additionally, flight control system 18 may be operable to communicate with remote systems via a wireless communications protocol such that some or all aspects of flight operations for aircraft system 10 may be remotely controlled.

Figure 3B:
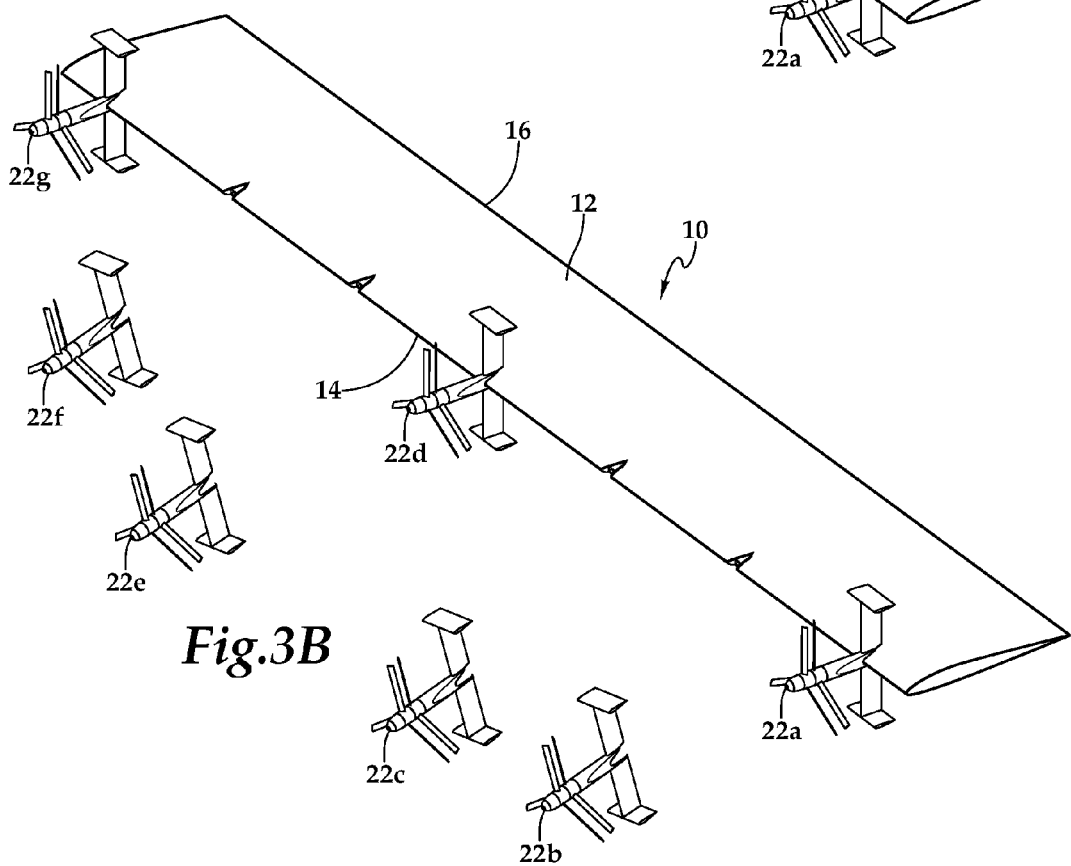

As discussed herein unmanned aircraft systems 22a-22g may be multirole UAS having precision digital flight control and navigation systems providing independent flight modes for unmanned aircraft systems 22a-22g when unmanned aircraft systems 22a-22g are detached or remote from wing member 12. In the present example, unmanned aircraft systems 22b, 22c, 22e, 22f are reconnaissance aircraft operating, for example, light detection and ranging modules while unmanned aircraft systems 22a, 22d, 22g are attack aircraft carrying, for example, air-to-ground missiles such as Hellfire or JAGM missiles. Beginning at FIG. 3A, wing member 12 may provide unmanned aircraft systems 22b, 22c, 22e, 22f with mission information while unmanned aircraft systems 22b, 22c, 22e, 22f are shut down. Unmanned aircraft systems 22b, 22c, 22e, 22f may now commence operations using, for example, the rotor sequencing protocol discussed herein to avoid rotor blade interference. Thereafter, wing member 12 performs an aerial launch of unmanned aircraft systems 22b, 22c, 22e, 22f, as best seen in FIG. 3B. For example, in performing the aerial launch, wing member 12 may shut down the current flow through the respective electromagnetic coils securably coupling unmanned aircraft systems 22b, 22c, 22e, 22f to wing member 12 such that the thrust generated by unmanned aircraft systems 22b, 22c, 22e, 22f separates unmanned aircraft systems 22b, 22c, 22e, 22f from wing member 12. Detached from wing member 12, unmanned aircraft systems 22b, 22c, 22e, 22f each operate in independent flight mode during which time unmanned aircraft systems 22b, 22c, 22e, 22f may cooperate together using networked communications to achieve mission goals.

In the present example, unmanned aircraft systems 22b, 22c, 22e, 22f perform an aerial survey of potential military targets which are preferably sufficiently remote from aircraft system 10 such that aircraft system 10 can avoid detection. Thereafter, unmanned aircraft systems 22b, 22c, 22e, 22f may return to wing member 12 and reconnect therewith via an aerial recovery process. As illustrated in FIG. 3C, unmanned aircraft systems 22c, 22e have been aerially recovered by wing member 12 and are shut down. Unmanned aircraft systems 22b, 22f are currently being aerially recovered by wing member 12 using, for example, the technique described herein of the wing member 12 extending docking probes 86b, 86f to magnetically couple with respective docking assemblies of unmanned aircraft systems 22b, 22f (see FIG. 2A). As discussed herein, docking probes 86b, 86f preferably include magnetic elements, at least one electrical connection and at least one data connection that couple with corresponding magnetic elements, electrical connections and data connections of unmanned aircraft systems 22b, 22f. Once unmanned aircraft systems 22b, 22f are securably coupled to docking probes 86b, 86f, wing member 12 may retract unmanned aircraft systems 22b, 22f into further engagement with wing member 12. Thereafter, unmanned aircraft systems 22b, 22f may be shut down such that aircraft system 10 returns to the state depicted in FIG. 3A, which is considered to be connected flight mode even when selected unmanned aircraft systems are shut down.

Computer systems within wing member 12 may now receive an upload of the information obtained by unmanned aircraft systems 22b, 22c, 22e, 22f during the reconnaissance missions. In addition, wing member 12 may resupply unmanned aircraft systems 22b, 22c, 22e, 22f with instructions for the next mission as well as recharge batteries within unmanned aircraft systems 22b, 22c, 22e, 22f. Depending, for example, upon the information obtained by wing member 12 from unmanned aircraft systems 22b, 22c, 22e, 22f as well as other factors, it may be desirable to send unmanned aircraft systems 22b, 22c, 22e, 22f on another set of reconnaissance missions to perform additional aerial surveys of potential military targets. In this case, wing member 12 would perform another aerial launch of unmanned aircraft systems 22b, 22c, 22e, 22f, as best seen in FIG. 3B, unmanned aircraft systems 22b, 22c, 22e, 22f would perform the reconnaissance missions in independent flight mode, wing member 12 would perform another aerial recovery of unmanned aircraft systems 22b, 22c, 22e, 22f, as best seen in FIG. 3C, and wing member 12 would exchange information with and resupply unmanned aircraft systems 22b, 22c, 22e, 22f, as best seen in FIG. 3A.

Once sufficient intelligence is gathered, it may be desirable to send unmanned aircraft systems 22a, 22d, 22g on an attack mission relating to one or more of the identified military targets. Starting from FIG. 3A, unmanned aircraft systems 22b, 22c, 22e, 22f commence operations using, for example, the rotor sequencing protocol discussed herein to avoid rotor blade interference. Thereafter, wing member 12 performs an aerial launch of unmanned aircraft systems 22a, 22d, 22g, as best seen in FIG. 3D. Detached from wing member 12, unmanned aircraft systems 22a, 22d, 22g each operate in independent flight mode during which time unmanned aircraft systems 22a, 22d, 22g may cooperate together using networked communications to achieve mission goals. In the present example, unmanned aircraft systems 22a, 22d, 22g may fly in formation to the location of the military target of interest and perform the desired military operation such as deploying air-to-ground missiles.

Thereafter, unmanned aircraft systems 22a, 22d, 22g may return to wing member 12 for an aerial recovery. Following the attack mission, it may be desirable to perform another aerial survey using unmanned aircraft systems 22b, 22c, 22e, 22f, as discussed herein.

Figure 4:
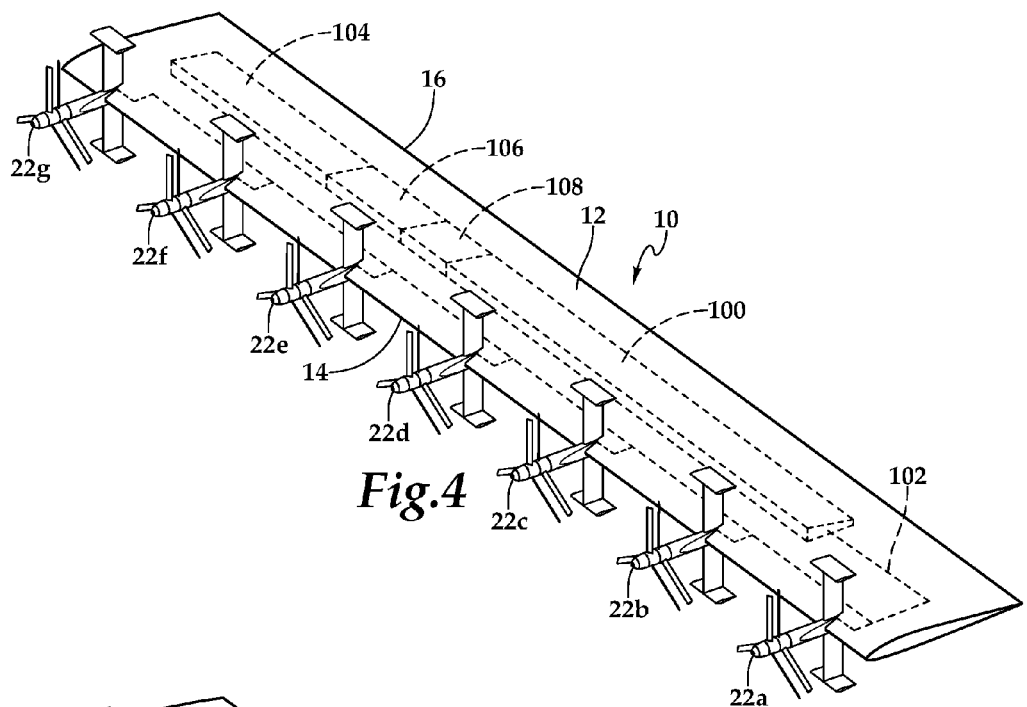
FIG. 4 is a schematic illustration of a mutually symbiotic aircraft system depicting a rechargeable electrical system of the wing member electrically coupled with the unmanned aircraft systems in accordance with embodiments of the present disclosure.
Figure 5:
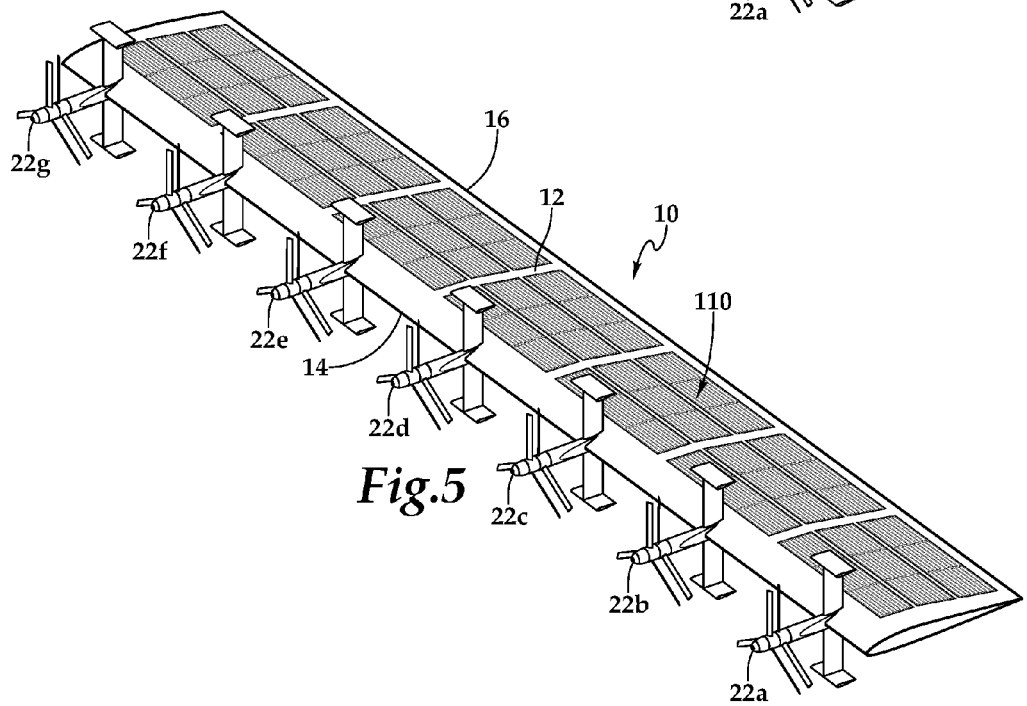
FIG. 5 is a schematic illustration of a mutually symbiotic aircraft system depicted with a solar energy collection system for recharging the electrical system of the wing member in accordance with embodiments of the present disclosure.

Referring next to FIG. 4 of the drawings, mutually symbiotic aircraft system 10 is depicted showing electrical components disposed within wing member 12 in phantom lines. In the illustrated embodiment, wing member 12 includes a battery system 100 comprised of a plurality of rechargeable battery elements. Battery system 100 is connected to an electrical communications network 102 that is operable to provide current to charge the batteries of the electronics packages of unmanned aircraft systems 22a-22g. Also disposed within wing member 12 is a liquid fuel tank 104, a liquid fuel burning engine 106 and a generator 108 used to recharge battery system 100, thus enhancing the endurance of aircraft system 10. Alternatively or additionally, as best seen in FIG. 5, aircraft system 10 may include a solar energy collection system 110 comprised of a plurality of solar cells used to recharge battery system 100 to further enhance the endurance of aircraft system 10.

Figures 6, 7:
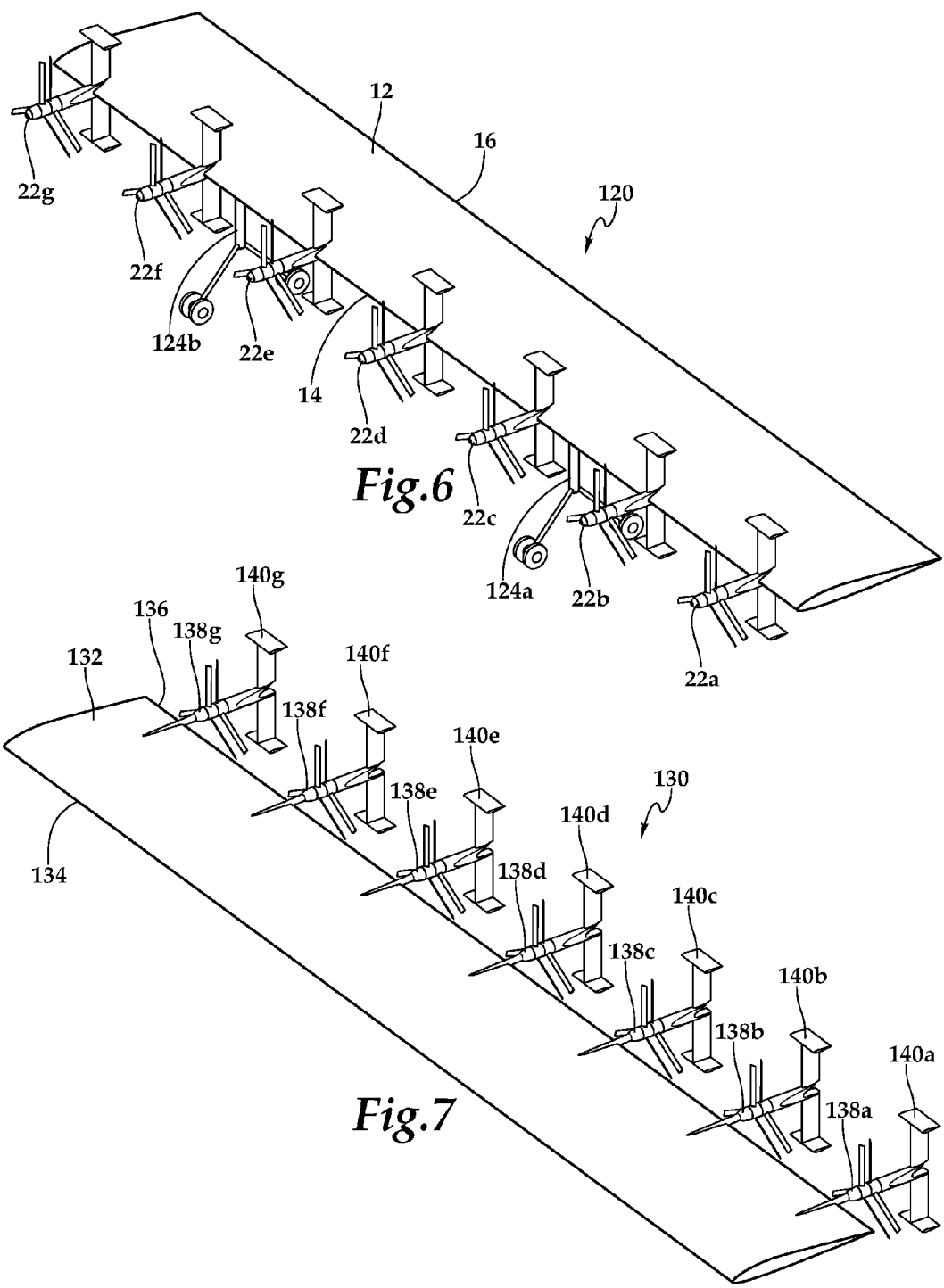
FIG. 6 is a schematic illustration of a mutually symbiotic aircraft system in a runway takeoff and landing mode in accordance with embodiments of the present disclosure.
FIG. 7 is a schematic illustration of a mutually symbiotic aircraft system in a forward flight mode in accordance with embodiments of the present disclosure.

Even though the aircraft systems of the present disclosure have been described as having a forward flight mode and a vertical takeoff and landing flight mode, it should be understood by those having ordinary skill in the art that aircraft systems of the present disclosure could have alternative takeoff and landing modes including an aerial or glider launch mode and/or an aerial recovery mode wherein an aircraft system of the present disclosure would cooperate with other aircraft during these modes. As another alternative, an aircraft system of the present disclosure could have a runway takeoff and/or landing mode. For example, referring to FIG. 6 of the drawings, aircraft system 120 includes a wing member 12 having a leading edge 14, a trailing edge 16 and an airfoil cross-section that generates lift responsive to the forward airspeed of aircraft system 120. As discussed herein, wing member 12 may house computer systems such as a flight control system, a data communications network, a battery system, an electrical communications network, liquid fuel tanks, an electrical generator system and other systems for supporting missions relating to aircraft system 120. Propulsion for wing member 12 is provided by unmanned aircraft systems 22a-22g that are operably coupled to leading edge 14 of wing member 12. As illustrated, unmanned aircraft systems 22a-22g are operable to provide forward thrust such that aircraft system 120 can operate in a runway takeoff and landing mode. Ground operations of aircraft system 120 may be supported by struts 124a, 124b that may be permanently attached to wing member 12 and preferably stowed during flight and deployed for runway landing. Alternatively, struts 124a, 124b may be jettisonable from wing member 12 after takeoff.

Even though the aircraft systems of the present disclosure have been described as having unmanned aircraft systems operably coupled to a leading edge of a wing member, it should be understood by those having ordinary skill in the art that aircraft systems of the present disclosure could have alternate configurations. For example, referring to FIG. 7 of the drawings, aircraft system 130 includes a wing member 132 having a leading edge 134, a trailing edge 136 and an airfoil cross-section that generates lift responsive to the forward airspeed of aircraft system 130. Wing member 132 may house computer systems such as a flight control system, a data communications network, a battery system, an electrical communications network, liquid fuel tanks, an electrical generator system and other systems for supporting missions relating to aircraft system 130. Wing member includes a plurality of docking ports depicted as aftwardly extending docking ports 138a, 138b, 138c, 138d, 138e, 138f, 138g that are operable to receive respectively, a forward docking assembly of unmanned aircraft systems 140a, 140b, 140c, 140d, 140e, 140f, 140g. In the illustrated connected flight mode, propulsion for wing member 132 is provided by unmanned aircraft systems 140a-140g that are operably coupled to trailing edge 136 of wing member 132.

In the illustrated embodiment, docking ports 138a-138g include conical receptacles to aid in guiding the respective forward docking assembly of unmanned aircraft systems 140a-140g into connection therewith. Each docking ports 138a-138g preferably includes a magnetic element, at least one electrical connection and at least one data connection which couple with a magnetic element, at least one electrical connection and at least one data connection of the respective forward docking assembly of unmanned aircraft systems 140a-140g. In one embodiment, the forward docking assembly of each unmanned aircraft systems 140a-140g includes a permanent magnet having a passageway therethrough for containing electrical and data communication lines that are coupled with the at least one electrical connection and at least one data connection of the forward docking assembly. Each forward docking assembly is designed to be received within a docking port 138a-138g, which preferably includes an electromagnet that is energized responsive to current flow controlled by the electrical system and flight control system of wing member 132. A strong magnetic connection may be achieved in this manner, which may be maintained to prevent separation of unmanned aircraft systems 140a-140g from wing member 132. Alternatively or additionally, a mechanical locking member or other system may be used to securably couple unmanned aircraft systems 140a-140g to wing member 132 after docking.

Even though the aircraft systems of the present disclosure have been described as having a particular number of unmanned aircraft systems operably coupled to a wing member, it should be understood by those having ordinary skill in the art that aircraft systems of the present disclosure could have other numbers of unmanned aircraft systems both less than or greater than that shown. In addition, even though the aircraft systems of the present disclosure have been described as having unmanned aircraft systems operably coupled to a single edge of a wing member, it should be understood by those having ordinary skill in the art that aircraft systems of the present disclosure could have alternate configurations. For example, referring to FIG. 8 of the drawings, aircraft system 150 includes a wing member 152 having a leading edge 154, a trailing edge 156 and an airfoil cross-section that generates lift responsive to the forward airspeed of aircraft system 150. Wing member 152 may house computer systems such as a flight control system, a data communications network, a battery system, an electrical communications network, liquid fuel tanks, an electrical generator system and other systems for supporting missions relating to aircraft system 150. Propulsion for wing member 152 is provided by unmanned aircraft systems 22a-22g that are operably coupled to leading edge 154 of wing member 152 and unmanned aircraft systems 140a-140g that are operably coupled to trailing edge 156 of wing member 152 at aftwardly extending docking ports 138a-138g. Preferably, both unmanned aircraft systems 22a-22g and unmanned aircraft systems 140a-140g are operable to dock on either leading edge 154 or trailing edge 156 of wing member 152.

Even though the aircraft systems of the present disclosure have been described as having a particular type of unmanned aircraft systems operably coupled to a wing member, it should be understood by those having ordinary skill in the art that aircraft systems of the present disclosure could have unmanned aircraft systems with alternate configurations. For example, referring to FIG. 9 of the drawings, aircraft system 160 includes a wing member 162 having a leading edge 164, a trailing edge 166 and an airfoil cross-section that generates lift responsive to the forward airspeed of aircraft system 160. Wing member 162 may house computer systems such as a flight control system, a data communications network, a battery system, an electrical communications network, liquid fuel tanks, an electrical generator system and other systems for supporting missions relating to aircraft system 160. Propulsion for wing member 162 is provided unmanned aircraft systems 168a-168g that are operably coupled to trailing edge 166 of wing member 162 at aftwardly extending docking ports 138a-138g. As illustrated, unmanned aircraft systems 168a-168g have shrouded rotor blades which may operate at higher efficiency than unshrouded rotor blades to further enhance high endurance flight of aircraft system 160.

Even though the aircraft systems of the present disclosure have been described as having a particular wing member design, it should be understood by those having ordinary skill in the art that wing members for aircraft systems of the present disclosure could have alternate configurations including swept wing designs, forward swept wing designs and multi wing designs such as bi wing and x-wing designs. For example, referring to FIG. 10 of the drawings, aircraft system 170 includes a wing member 172 having a leading edge 174, a trailing edge 176 and an airfoil cross-section that generates lift responsive to the forward airspeed of aircraft system 170. Wing member 172 may house computer systems such as a flight control system, a data communications network, a battery system, an electrical communications network, liquid fuel tanks, an electrical generator system and other systems for supporting missions relating to aircraft system 170. In the illustrated embodiment, wing member 172 is best described as having a slightly swept wing design which may improve efficiency due to reduced drag in certain flight conditions. Propulsion for wing member 172 is provided by unmanned aircraft systems 22a-22g that are operably coupled to leading edge 174 of wing member 172.

In another example, referring to FIG. 11 of the drawings, aircraft system 180 has a multi wing design depicted as x-wing members 182, 184. X-wing member 182 has a leading edge 186, a trailing edge 188 and an airfoil cross-section that generates lift responsive to the forward airspeed of aircraft system 180. X-wing member 184 has a leading edge 190, a trailing edge 192 and an airfoil cross-section that generates lift responsive to the forward airspeed of aircraft system 180. X-wing members 182, 184 may house computer systems such as a flight control system, a data communications network, a battery system, an electrical communications network, liquid fuel tanks, an electrical generator system and other systems for supporting missions relating to aircraft system 180. Propulsion for x-wing members 182, 184 is provided by unmanned aircraft systems 22a-22f that are operably coupled to leading edge 186 of x-wing member 182 and unmanned aircraft systems 22g-22l that are operably coupled to leading edge 190 of x-wing member 184.

Figure 12A:
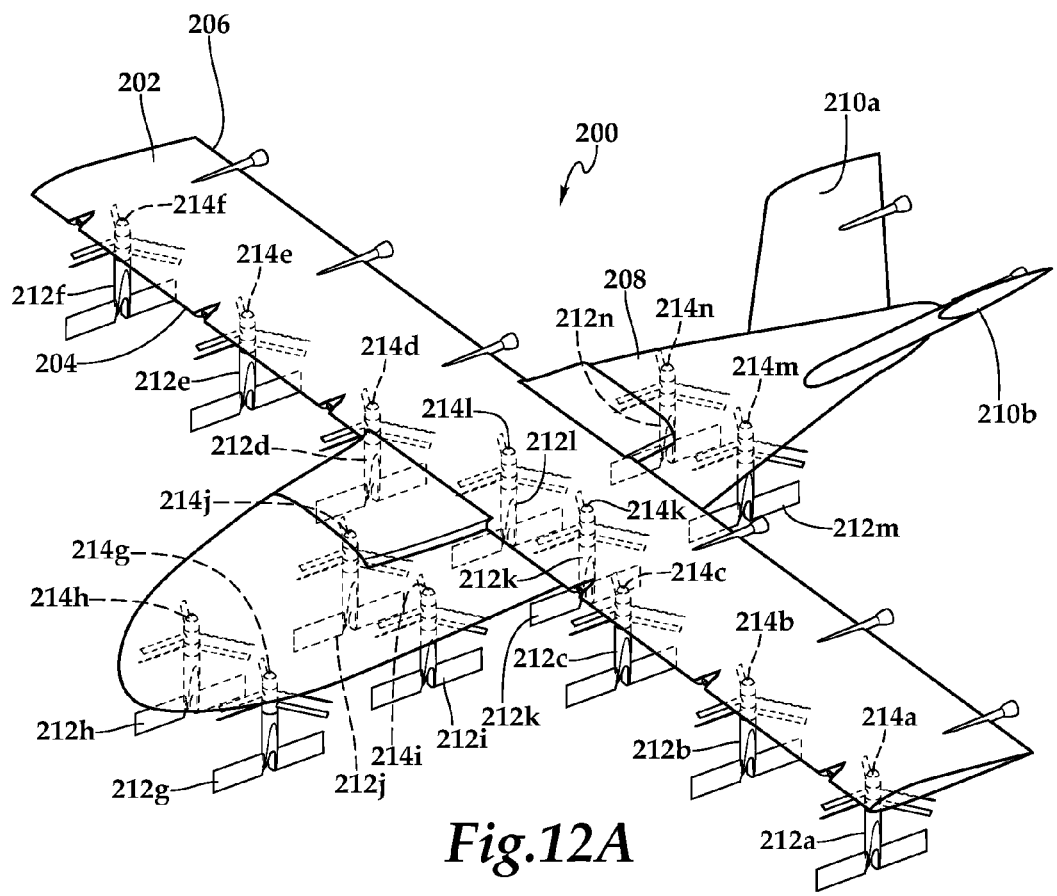
FIGS. 12A-12C are schematic illustrations of a mutually symbiotic aircraft system in a vertical takeoff and landing flight mode, a transition mode and a forward flight mode, respectively, in accordance with embodiments of the present disclosure.
Figure 12B:
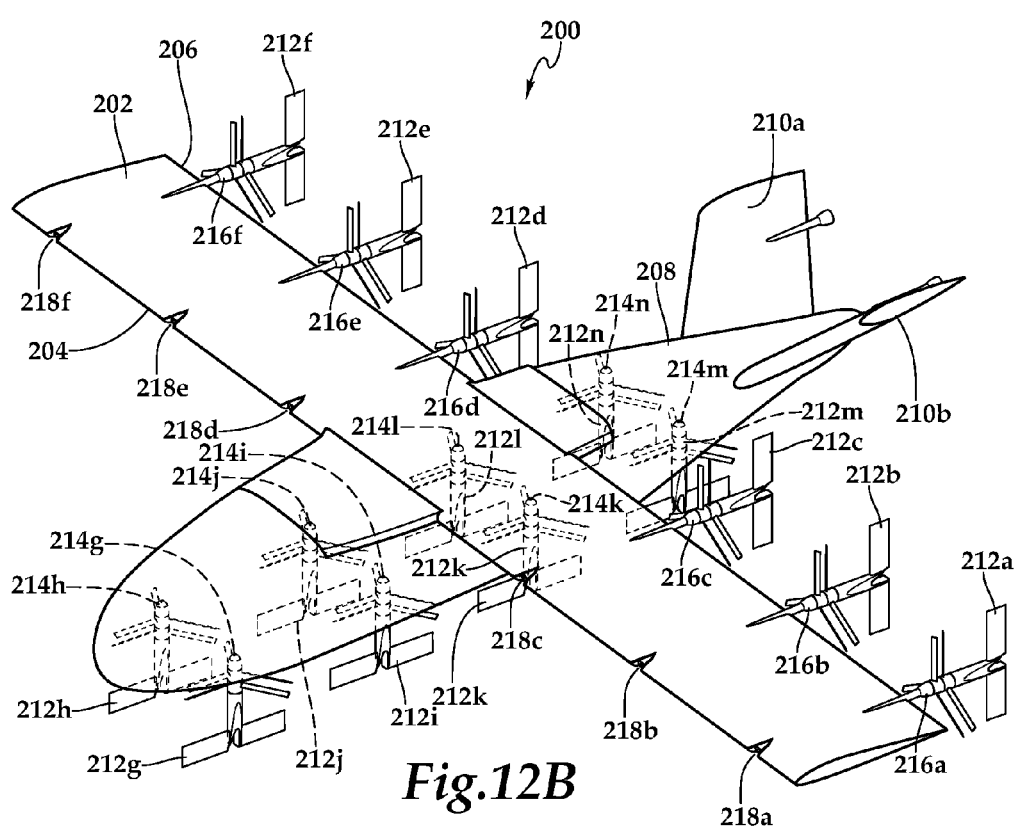

Even though the aircraft systems of the present disclosure have been described as having unmanned aircraft systems providing propulsion to a wing member that resupplies the unmanned aircraft systems after detached operations, it should be understood by those having ordinary skill in the art that aircraft systems of the present disclosure could have alternate designs. Also, even though the aircraft systems of the present disclosure have been described as having unmanned aircraft systems operably coupled to the leading and/or training edges of a wing member, it should be understood by those having ordinary skill in the art that aircraft systems of the present disclosure could have alternate configurations. For example, referring to FIGS. 12A-12C of the drawings, aircraft system 200 includes a wing member 202 having a leading edge 204, a trailing edge 206 and an airfoil cross-section that generates lift responsive to the forward airspeed of aircraft system 200. In the illustrated embodiment, wing member 202 is operably coupled to a fuselage 208 having tail members 210a, 210b. Fuselage 208 and/or wing member 202 may house computer systems such as a flight control system, a data communications network, a battery system, an electrical communications network, liquid fuel tanks, an electrical generator system and other systems for supporting missions relating to aircraft system 200. Aircraft system 200 having fuselage 208 may have the advantage of supporting a greater number of battery elements, a greater liquid fuel capacity and other systems that may improve the endurance and/or capabilities of aircraft system 200.

As best seen in FIG. 2A, aircraft system 200 is in a vertical takeoff and landing flight mode in which vertical lift is provided by unmanned aircraft systems 212a-212f that are operably coupled to docking ports 214a-214f on the lower surface of wing member 202. In addition, vertical lift is provided by unmanned aircraft systems 212g-212n that are operably coupled to docking ports 214g-214n on the lower surface of fuselage 208. In the illustrated embodiment, all unmanned aircraft systems 212a-212n are in connected flight mode and operable to provide vertical thrust for aircraft system 200. When aircraft system 200 reaches a desired altitude, various unmanned aircraft systems 212a-212n may begin the process for transitioning aircraft system 200 from vertical takeoff and landing flight mode to forward flight mode. As best seen in FIG. 2B, unmanned aircraft systems 212a-212f have been aerially launched from docking ports 214a-214f on the lower surface of wing member 202 (not visible in FIG. 12B) and have been aerially recovered with aftwardly extending docking ports 216a-216f such that unmanned aircraft systems 212a-212f are operably coupled to trailing edge 206 of wing member 202. In this configuration, unmanned aircraft systems 212a-212f may provide forward thrust to aircraft system 200 with wing member 202 proving lift responsive to the forward airspeed of aircraft system 200.

Figure 12C:
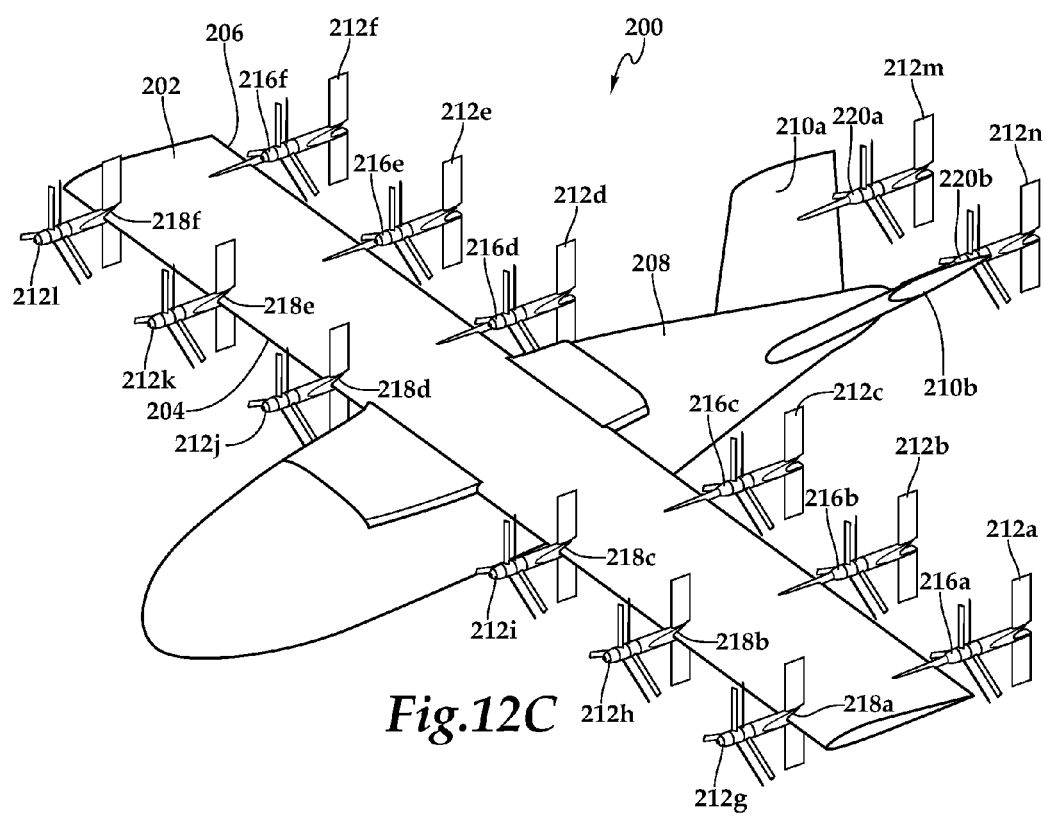

As best seen in FIG. 12C, unmanned aircraft systems 214g-214n have been aerially launched from docking ports 214g-214n on the lower surface of fuselage 208 (not visible in FIG. 12C) and have been aerially recovered with docking ports 218a-218f on leading edge 204 of wing member 202 and aftwardly extending docking ports 220a-220b of tail members 210a, 210b such that unmanned aircraft systems 214g-2141 are operably coupled to leading edge 204 of wing member 202 and unmanned aircraft systems 214m-214n are operably coupled to tail members 210a, 210b. In this configuration, unmanned aircraft systems 212a-212n may provide forward thrust to aircraft system 200 with wing member 202 proving lift responsive to the forward airspeed of aircraft system 200. As discussed above, individual and/or groups of unmanned aircraft systems 212a-212n may be repeatably and sequentially aerially launched from and aerially covered by aircraft system 200 such that unmanned aircraft systems 212a-212n can perform various missions detached from aircraft system 200. When it is desired to land aircraft system 200, unmanned aircraft systems 212a-212n preferably couple to docking ports 214a-214f on the lower surface of wing member 202 and docking ports 214g-214n on the lower surface of fuselage 208 to return aircraft system 200 to vertical takeoff and landing flight mode.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft system comprising:
   a wing member having an airfoil cross-section, a leading edge and a trailing edge; and
   a plurality of unmanned aircraft systems selectively connectable to the wing member, the unmanned aircraft systems having a connected flight mode in which the unmanned aircraft systems are connected to the leading edge of the wing member and an independent flight mode,
   wherein, in the connected flight mode, the unmanned aircraft systems are operable to provide propulsion to the wing member to enable flight;
   wherein, the unmanned aircraft systems are operable to be launched from the wing member to perform aerial missions in the independent flight mode;
   wherein, the unmanned aircraft systems are operable to be recovered by the wing member and returned to the connected flight mode; and
   wherein, in the connected flight mode, the unmanned aircraft systems are operable to be resupplied by the wing member.

2. The system as recited in claim 1 further comprising a fuselage connected to and extending generally perpendicular to the wing member.

3. The system as recited in claim 1 wherein the wing member further comprises a flight control system operable to control the unmanned aircraft systems in the connected flight mode.

4. The system as recited in claim 1 wherein each of the unmanned aircraft systems further comprises a flight control system operable to control the respective unmanned aircraft system in the independent flight mode.

5. The system as recited in claim 1 wherein the unmanned aircraft systems provide vertical thrust for the aircraft system in a vertical takeoff and landing flight mode.

6. The system as recited in claim 1 wherein the unmanned aircraft systems provide forward thrust for the aircraft system in a runway takeoff and landing mode.

7. The system as recited in claim 1 wherein the unmanned aircraft systems provide forward thrust for the aircraft system in a forward flight mode.

8. The system as recited in claim 1 wherein the unmanned aircraft systems are magnetically coupled to the wing member in the connected flight mode.

9. The system as recited in claim 1 further comprising electrical connections between the unmanned aircraft systems and the wing member in the connected flight mode.

10. The system as recited in claim 1 further comprising data connections between the unmanned aircraft systems and the wing member in the connected flight mode.

11. The system as recited in claim 1 wherein the wing member further comprises a battery system operable to electrically recharge the unmanned aircraft systems in the connected flight mode.

12. The system as recited in claim 11 wherein the wing member further comprises a battery recharging system selected from the group consisting of a solar energy collection system and a liquid fuel driven generator system.

13. A method of operating an aircraft system including a wing member having an airfoil cross-section, a leading edge and a trailing edge and a plurality of unmanned aircraft systems selectively connectable with the wing member, the method comprising:
providing forward thrust for the aircraft system with the unmanned aircraft systems in a connected flight mode in which the unmanned aircraft systems are connected to the leading edge of the wing member;
launching a first group of the unmanned aircraft systems from the wing member while maintaining a second group of the unmanned aircraft systems in the connected flight mode;
performing aerial missions detached from the wing member with the first group of unmanned aircraft systems in an independent flight mode;
recovering the first group of the unmanned aircraft systems with the wing member and reestablishing the connected flight mode; and
resupplying the first group of the unmanned aircraft systems from the wing member after reestablishing the connected flight mode.

14. The method as recited in claim 13 further comprising relaunching the first group of the unmanned aircraft systems from the wing member after resupplying.

15. The method as recited in claim 13 further comprising launching the second group of the unmanned aircraft systems from the wing member while maintaining the first group of the unmanned aircraft systems in the connected flight mode.

16. The method as recited in claim 13 further comprising controlling the operation of the unmanned aircraft systems in the connected flight mode with a flight control system of the wing member.

17. The method as recited in claim 13 further comprising providing vertical thrust for a vertical takeoff and landing flight mode of the aircraft system with the unmanned aircraft systems in the connected flight mode.

18. The method as recited in claim 13 wherein resupplying the first group of the unmanned aircraft systems from the wing member after reestablishing the connected flight mode further comprises electrically recharging the first group of the unmanned aircraft systems from a battery system of the wing member and providing mission information to the first group of the unmanned aircraft systems from a mission control system of the wing member.

19. The method as recited in claim 13 wherein recovering the first group of the unmanned aircraft systems with the wing member and reestablishing the connected flight mode further comprises magnetically coupling the first group of the unmanned aircraft systems to the wing member, establishing electrical communication between the first group of the unmanned aircraft systems and the wing member and establishing data communication between the first group of the unmanned aircraft systems and the wing member.

* * * * *